United States Patent
Narzisi et al.

(10) Patent No.: US 9,785,505 B1
(45) Date of Patent: Oct. 10, 2017

(54) COMMUNICATIVE BUILDING MANAGEMENT SYSTEM FOR DATA LOSS PREVENTION

(71) Applicant: Amazon Technologies, Inc., Reno, NV (US)

(72) Inventors: Ryan Narzisi, Seattle, WA (US); Giorgio Arturo Pompei, Seattle, WA (US); Brock Robert Gardner, Seattle, WA (US); Peter George Ross, Olympia, WA (US)

(73) Assignee: Amazon Technologies, Inc., Reno, NV (US)

( * ) Notice: Subject to any disclaimer, the term of this patent is extended or adjusted under 35 U.S.C. 154(b) by 742 days.

(21) Appl. No.: 14/275,443

(22) Filed: May 12, 2014

(51) Int. Cl.
*G06F 11/14* (2006.01)
*G06F 11/30* (2006.01)

(52) U.S. Cl.
CPC .......... *G06F 11/14* (2013.01); *G06F 11/1451* (2013.01); *G06F 11/1456* (2013.01); *G06F 11/1464* (2013.01); *G06F 11/3058* (2013.01); *G05B 2219/163* (2013.01); *G05B 2219/25011* (2013.01); *G05B 2219/25168* (2013.01); *G05B 2219/2614* (2013.01); *G05B 2219/2642* (2013.01)

(58) Field of Classification Search
None
See application file for complete search history.

(56) References Cited

U.S. PATENT DOCUMENTS

| | | | | |
|---|---|---|---|---|
| 6,496,949 B1 * | 12/2002 | Kanevsky | ........... | G06F 11/1456 340/3.3 |
| 7,840,992 B1 * | 11/2010 | Dufrene | .............. | G06F 11/1461 726/1 |
| 2015/0134723 A1 * | 5/2015 | Kansal | ................ | H04L 67/1031 709/203 |

OTHER PUBLICATIONS

Clark, Jeff "BMS and the Data Center", Jul. 10, 2012, The Data Center Journal.*
Kleyman, Bill "Data Center Monitoring System Considerations", Dec. 2011.*
T.A.C., "Integrated Building Management Systems in Data Centers", 2007, pp. 1-16.
General Electric Company, "GE Total Efficiency Datacenter; Hardware, Software, Services and Financing to Address Power, Cooling, and Energy Management Challenges", 2012, pp. 1-12.

* cited by examiner

*Primary Examiner* — Qing Wu
(74) *Attorney, Agent, or Firm* — Robert C. Kowert; Meyertons, Hood, Kivlin, Kowert & Goetzel, P.C.

(57) ABSTRACT

A communicative building management system (BMS) can enable replication of data from computer systems that may potentially be affected by various external events. The BMS is coupled to environmental sensors and configured to receive sensor signals and communicate with one or more computer systems implementing a service. The BMS notifies a console system administrating a service that one or more computer systems implementing the service are affected by a data center event based on signals received from one or more sensor devices associated with a zone including the affected computer systems. A console system (Continued)

commands replication of data stored on the affected computer systems to separate computer systems based at least in part on the notification from the BMS indicating the computer systems are affected by the data center event.

20 Claims, 20 Drawing Sheets

Service Portion and Priority Information 1300

| Computer System ID | Portion Implemented | Portion Priority |
|---|---|---|
| 1_1 | Port_1 | 2 |
| 1_2 | Port_4 | 2 |
| 1_3 | Port_6 | 1 |
| 2_1 | Port_3 | 3 |
| 2_2 | Port_5 | 2 |
| 2_3 | Port_7 | 3 |
| 2_3 | Port_2 | 2 |
| 2_3 | Port_8 | 1 |

FIG. 13

COMMUNICATIVE BUILDING MANAGEMENT SYSTEM FOR DATA LOSS PREVENTION

BACKGROUND

Organizations such as on-line retailers, network-based service providers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Large scale computing systems, more commonly referred to as data centers, often store large amounts of data. Some implementations allow for data to be stored in multiple data centers, while other implementations do not collocate data amongst different data centers. Some implementations collocate data amongst multiple servers located within a single data center, while others store only a single copy of a piece of data on a single server. Colocation of data between data centers or servers may prevent loss of stored data due to a single event affecting a data center or server. Data centers may be coupled to other data centers by networks. Data from one server in one data center location may be replicated to another server in another data center location through a network connection between the data centers.

In some cases, a building management system (BMS) may manage certain operations for a data center's physical plant. For example, a BMS may be responsible for monitoring heating ventilation and air conditioning (HVAC) systems, power systems, and building safety systems such as fire and security. Typical BMS systems are separate from the computer systems in the data centers they manage. Some BMS systems may be simple electro-mechanical systems that relay events but do not perform logical operations in regard to detected events.

BRIEF DESCRIPTION OF THE DRAWINGS

FIG. 1A illustrates data centers with building management systems (BMS) that are coupled via a communication network to console systems under normal operations, according to some embodiments.

FIG. 1B illustrates an environmental sensor in a data center detecting smoke from a fire in the data center and sending sensor signals to a BMS, according to some embodiments.

FIG. 1C illustrates a BMS sending an event signal to console systems via a communication network, according to some embodiments.

FIG. 1D illustrates a console system commanding replication of data from a computer system affected by a fire to another computer system, according to some embodiments.

FIG. 1E illustrates a service portion in a data center being replicated from an affected computer system to a separate computer system, according to some embodiments.

FIG. 4A illustrates a data center comprising an underfloor plenum, racks, and sensors coupled to a BMS, according to some embodiments.

FIG. 4B illustrates a data center comprising a cooling air duct, racks, and sensors coupled to a BMS, according to some embodiments.

FIG. 4C illustrates a data center comprising an overhead plenum, racks, and sensors coupled to a BMS, according to some embodiments.

FIG. 13 illustrates a database used by a console system, according to some embodiments.

Figure 1A:
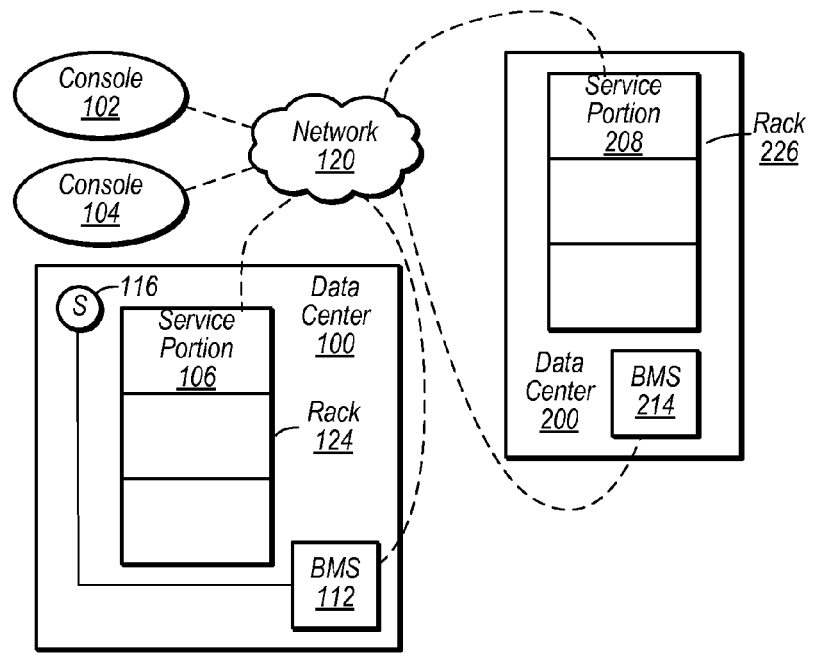
FIGS. 1A-E illustrate replicating data from a computer system in response to a fire, according to some embodiments. Each of FIGS. 1A-E is described individually below.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

A communicative building management system (BMS), and systems and methods of managing replication of data in response to various data center events sensed by a communicative BMS are disclosed. A data center may include one or more sets of computer systems in zones within the data center. The computers may be storing data and/or running one or more computation tasks for one or more users. The data center may include a building management system (BMS) coupled to one or more sensors where the area of the data center covered by a sensor is a zone associated with that sensor. For example, a smoke sensor may be configured to detect smoke in a particular area (e.g., room, aisle, section of an aisle, etc.) in a data center and the area the smoke sensor protects may be the zone associated with the smoke sensor. A sensor signal may indicate a particular zone associated with a data center event and a particular type of data center event. The BMS may generate event signals based on receipt of the sensor signals from the environmental sensors. Event signals generated by the BMS may indicate one or more zones associated with the data center event and the type of data center event. For example, the BMS may determine that a data center event type is a fire in the particular room that makes up the zone associated with a smoke sensor based on receiving the sensor signal from the smoke sensor. The BMS may communicate with one or more building systems in order to respond to the event, such as alarm systems and fire suppression systems. The BMS may also be in network communication with one or more console systems that are not part of the building infrastructure but instead are part of one or more data or computational services running on the computers in the data center. The one or more console systems manage or administer the data or computational tasks on the computers in the data center. In response to an event detected for a particular zone (e.g., smoke or fire event), the BMS may send an event signal over a network to the one or more console system for the affected zone to trigger a replication process of state information on the computers in the affected zone to other computers in an unaffected zone, e.g., in the same data center or in a different data center. The state information may be data stored on the computers in the affected zone or computational state information for computational tasks running on computers in the affected zone.

The console systems may administrate one or more service portions of one or more network-based services. A network-based service may include instances of state information, such as the state of computational tasks performed by the network-based service on behalf of one or more users, and/or data stored on behalf of one or more users. A service portion of the network-based service may be implemented on one or more computer systems in the data center. Each console system may administrate the activities of several computer systems. The network-based service may be implemented on multiple computer systems within a data center or across data centers. Each console system may also be implemented on a computer in a data center or across data centers and administrate the other computers that are implementing the network-based service. A network may also connect the console systems to the BMS. Console systems may command replication of instances of state information stored on one or more computer systems implementing a service portion of the network based service to one or more separate computer systems based on receiving an event signal from the BMS. For example, a console system administrating a service comprising service portions performing financial transactions may order a computer implementing one of the service portions of the service performing financial transactions to replicate financial information to a separate computer system in response to receiving an event signal from the BMS indicating a fire at the location of the computer implementing the service portions performing the financial transactions. The event signal may indicate a particular computer system that implements a service portion administered by the console system is located in a particular zone associated with the data center event. The console system may command replication in response to identifying a particular computer system as an affected computer system. In some embodiments, a console system may respond to a command from the BMS to replicate state information stored on a particular computer system.

According to some embodiments, a building management system may include a processing module and a notification module. The processing module may receive sensor signals from sensor devices associated with particular zones of a data center. In response to receiving a sensor signal, the processing module may identify a zone of a data center as being associated with a data center event. For example, the processing module may identify a particular zone as being associated with a fire. The notification module may generate an event signal that may indicate one or more particular computer systems that may be located in the zone associated with the data center event. For example the notification module may generate an event signal that computers located in the particular zone may be affected by a fire. The notification module may transmit the event signal via a communication network to at least one console system managing a service portion on one or more computer systems located in a zone associated with the data center event. A console system may be configured to command replication of instances of state information from computer systems located in the zone associated with the data center event to separate computer systems outside the affected zone based on identifying a service portion as being implemented on a computer system associated with the data center event.

According to some embodiments, a console computer system may store program instructions that may cause the console computer system to identify one or more computer systems implementing a service portion administrated by the console computer system as being associated with a data center event based on receiving an event signal from a BMS. The program instructions may cause the console computer system to command replication of one or more instances of state information stored in one or more computer systems based on identifying the one or more computer systems as being associated with the data center event.

As used herein, "building management control function" refers to an action taken by a building management system (BMS) to mitigate the effect of a data center event on data center operations. Examples include activating a fire alarm, sprinkler system, and any other actions to mitigate the effect of a data center event.

As used herein, "building management system (BMS)" refers to a system configured to manage building or other physical plant services such as fire protection, power supply, climate control, and other various data center services.

As used herein, "console system" refers to a system administrating at least a portion of a network-based service. Service portions being administered can include instances of a service, programs of instruction, processes, etc. Portions of the network-based service may be implemented on one or more computer systems, including computer systems remote from one or more computer systems implementing the console system.

As used herein, "event signal" refers to a signal sent from a BMS indicating an occurrence of an event affecting the building or physical plant, e.g., data center, or portion thereof, being managed by the BMS.

As used herein, "service portion" refers to one or more sets of state information on a particular computer system.

The one or more sets of state information may include data stored on the computer system, computational state for one or more processes running on the computer system, data or code for an aspect of a network based service implemented on one or more computer systems, etc.

As used herein, "service" refers to an application that provides computation, processing, data storage, manipulation, presentation, and/or other capabilities for one or more users, where the service is running on one or more computer systems and accessed via a network.

As used herein, "zone" refers to a region of a data center. One or more sensor devices can be associated with one or more zones of a data center. A data center may comprise multiple zones and multiple zones may cover the same particular location in the data center when multiple sensors provide coverage for the same particular location, or may cover mutually exclusive locations in other embodiments.

FIGS. 1A-E illustrate a communicative building management system responding to an event (e.g., fire) in data center 100 and commanding replication of state information to data center 200 in response to the event, according to some embodiments. FIGS. 1A-E represent a sequence of responses taken by BMS 112 and console system 102 in response to sensing the event in data center 100.

FIG. 1A illustrates data center 100 comprising building management system (BMS) 112 and data center 200 comprising BMS 214 with BMS 112 and BMS 214 coupled to console systems 102 and 104 via network 120, according to some embodiments. Data center 100 includes BMS 112 coupled to smoke sensor 116 and rack 124 comprising one or more computer systems. At least one of the computer systems in rack 124 may be implementing one or more network based services. A network based service can include one or more service portions running on computer systems implementing the service. A portion of a network based service, also referred to as hereinafter as a "service portion", can include one or more instances of the network based service and one or more processes associated with the network based service. Data center 100 includes service portion 106 being implemented on a computer system in rack 124. BMS 112 and the computer systems in rack 124 are connected to console systems 102 and 104 via network 120.

In some embodiments, a service portion may comprise data stored on a computer system implementing a portion of a network based service. In some embodiments, a service portion may comprise state information relating to a process of a network based service implemented on a computer system implementing a portion of the network based service.

Data Center 200 may include BMS 214 and rack 226 comprising one or more computer systems. Data center 200 may include service portion 208 running on a computer system located in rack 226 and other computer systems located in rack 226. BMS 214 and the computer systems in rack 226 may be connected to console systems 102 and 104 via network 120. The computer systems in rack 124 and the computer systems in rack 226 may also connect to each other via network 120.

BMS 112 may receive a sensor signal from smoke sensor 116. In response to receiving a sensor signal from smoke sensor 116, BMS 112 may determine one or more affected computer systems based on information stored in a directory that identifies the location of each computer system in data center 100 and based on a zone associated with the sensor signal from smoke sensor 116. After determining affected computer systems, BMS 112 may generate an event signal to send to console systems 102 and 104 administrating services that may be implemented on one of the affected computer systems. Console system 102 and 104 may command a particular computer system implementing a service portion of one of the services to replicate data associated with the service portion of the service implemented on the affected computer system. The data associated with the service portion can include state information associated the service portion.

In FIG. 1A two console systems are illustrated, however some embodiments may include more or less console systems. In some embodiments, console systems may be implemented in hardware or software. A console system may be implemented on one or more computer system and is not limited to implementation in a particular location. In some embodiments, a console system may be implemented on the same particular computer system that implements a service portion the console system is administrating.

In FIG. 1A console 102 and console 104 are illustrated as implemented in a separate location other than data centers 100 and 200 according to some embodiments. In various embodiments console system 102 and console system 104 may be implemented in data center 100 and data center 200. In some embodiments, console 102 and console 104 may be implemented on the same computer systems implementing service portion 106 and service portion 208.

In some embodiments, smoke sensor 116 may be another type of sensor configured to indicate a data center event. In some embodiments smoke sensor 116 may be coupled to BMS 112 by hard wires or wirelessly. In some embodiments smoke sensor 116 may be coupled to BMS 112 by network 120.

Figure 1B:
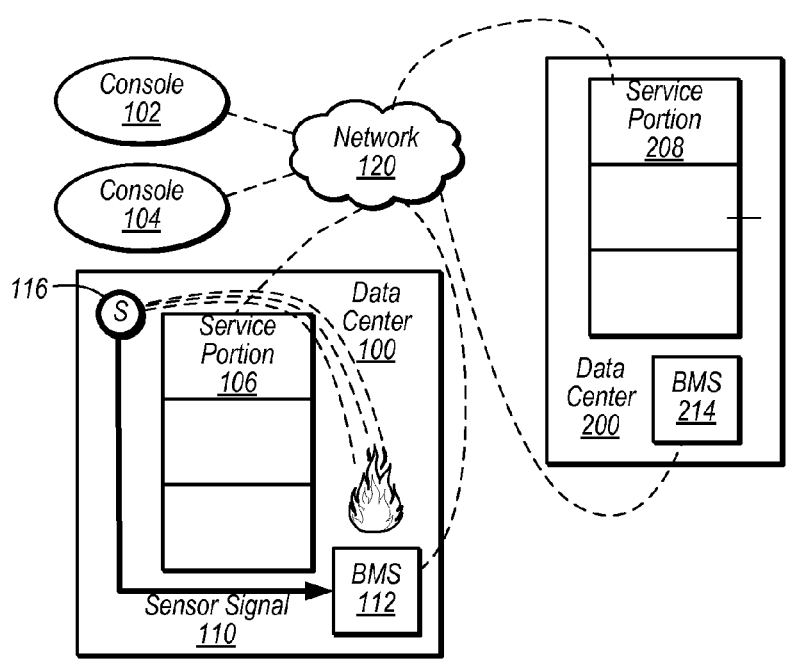

FIG. 1B illustrates smoke sensor 116 detecting a fire in data center 100 according to some embodiments. Smoke sensor 116 detects smoke from a fire and sends a sensor signal to BMS 112. BMS 112 identifies smoke sensor 116 as associated with a particular zone in data center 100 by consulting a directory of computer systems associated with particular zones of data center 100. BMS 112 also identifies smoke sensor 116 as associated with a particular type of data center event, i.e. fire based on information stored in the directory.

Figure 1C:
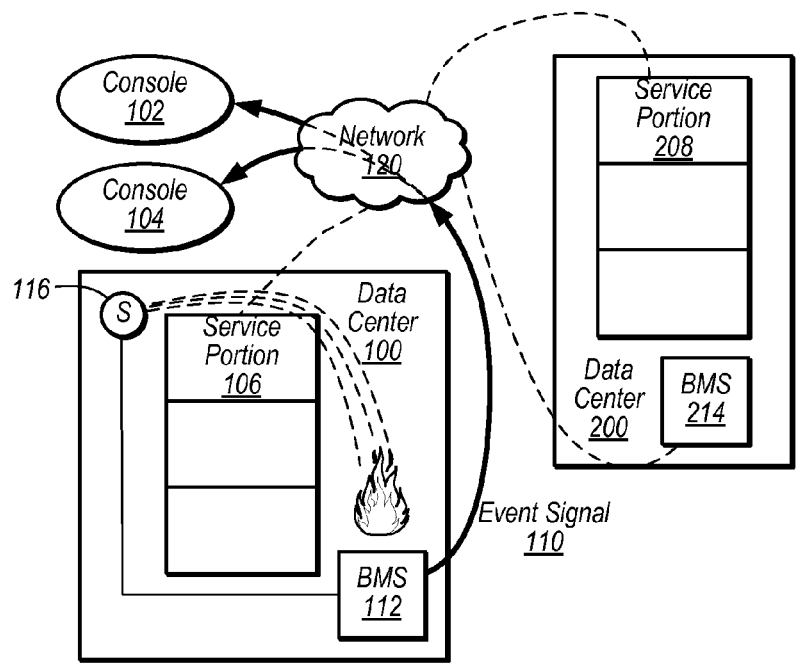

FIG. 1C illustrates BMS 112 sending an event signal to console systems 102 and 104 according to some embodiments. After identifying smoke detector 116 as associated with a particular zone of data center 100 and associated with a particular data center event type, i.e. fire, BMS 112 may generate and transmit an event signal to console system 102 and console system 104. The event signal may comprise a list of all the computer systems affected by the data center event or may selectively comprise the computer systems implementing a service portion administrated by console 102 or console 104 that are affected by the data center event. BMS 112 may determine a data center event priority level based on the type of data center event. For example, a fire may receive a higher priority than a loss of air conditioning. BMS 112 may base the data center event priority on one or more sensor signals and a directory that identifies the type of sensor associated with each sensor signal. After determining the computer systems affected by the data center event, BMS 112 may determine the service portions of one or more services implemented on the affected computer systems and a service portion priority associated with the service portions on the affected computer systems by consulting a directory comprising information about which service portions are implemented on which computer systems and what the service priority is for each service portion.

In some embodiments BMS 112 may transmit an event signal to multiple console systems administrating various services indicating all affected computer systems in the affected zone or zones of data center 100. In some embodiments, BMS 112 may determine services that are implemented on affected computer systems and may selectively send event signals to services implemented on the affected computer systems. In some embodiments, BMS 112 may determine services implemented on affected computer systems, a service priority of each service implemented on one or more affected computer systems, and may send event signals selectively to the console systems administrating services implemented on the affected computer systems in a prioritized sequence.

In some embodiments BMS 112 may selectively send event signals to console systems administrating services with a service priority above a certain level. In some embodiments BMS 112 may determine a priority of one or more service portions implemented on an affected computer system and assign a replication priority based on the priority of the one or more service portions implemented on the affected computer system. In some embodiments BMS 112 may determine one or more service portions implemented on an affected computer system is stored on one or more redundant computer systems. In some embodiments, BMS 112 may selectively send an event signal to console systems administrating a service comprising one or more service portions that are non-redundant.

In some embodiments, BMS 112 may receive more than one sensor signal from more than one sensor in data center 100. BMS 112 may determine one or more zones associated with the one or more sensor signals, affected computer systems located within the zones and may identify services implemented on the affected computer systems. BMS 112 also may determine a data center event priority for each zone based on the type of sensor signal received and whether or not there are multiple sensor signals from the same zone. BMS 112 then may send event signals to the affected services identifying the affected computer systems implemented by each affected service and a data center event priority.

In some embodiments BMS 112 may determine a new event priority level based on receiving additional sensor signals. In some embodiments, BMS 112 may determine a sensor signal is a false alarm based on not receiving a confirmation sensor signal. In some embodiments BMS 112 may send a subsequent event signal to indicate a change in an event priority level or to indicate a false alarm. In some embodiments BMS 112 may command a particular replication rate based at least in part on the event priority level. In some embodiments BMS 112 may determine a destination computer system to receive the replicated state information based at least in part on the physical proximity of the destination computer system and the affected computer system. In some embodiments, BMS 112 may send event signals to console systems in a prioritized order based on the data center event priority In some embodiments zones may coincide, such that a zone covered by one sensor may overlap with a zone covered by another sensor. A particular computer system may be located in more than one zone based on overlapping sensor coverage. Also, different types of sensors may have different zones. For example, in some embodiments a smoke sensor may cover a room that has multiple temperature zones or a power sensor may cover multiple rooms comprising multiple smoke sensor zones. For example, two computer systems may be in the same zone covered by a power sensor but in different zones covered by a smoke sensor.

Figure 1D:
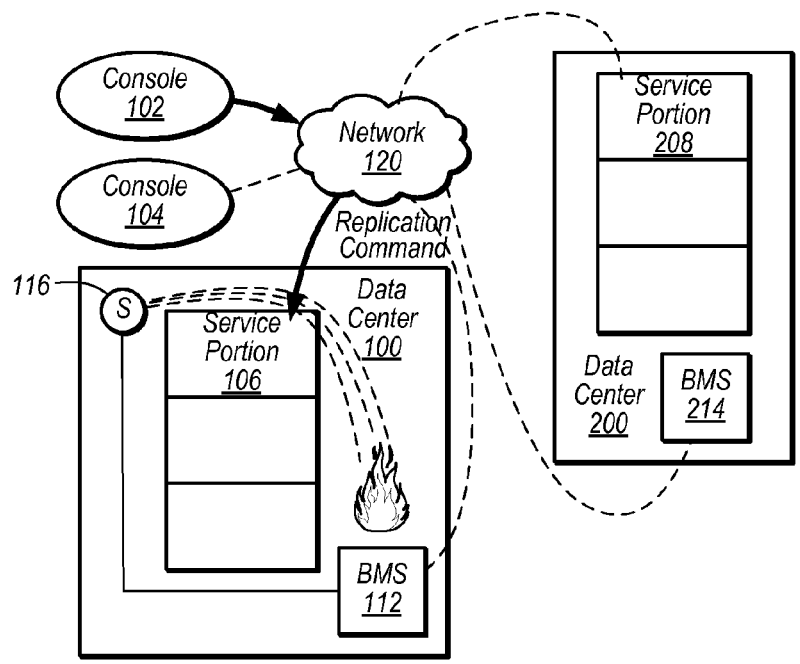

FIG. 1D illustrates console 102 determining that it is administrating an affected service and sending a replication command to the computer system implementing service portion 106 according to some embodiments. Console 102 may receive the event signal from BMS 112 and may command replication of service portion 106 implemented on one of the affected computer systems identified in the event signal. In some embodiments, BMS 112 may send a broadcast message to console 102. The event signal may identify the affected computer systems but not the affected services. Console 102 may receive the broadcast message and determine if a service it is administrating is implemented on one of the affected computer systems. If a service is implemented on one of the affected computer systems, console system 102 may command replication of instances of state information on the affected computer systems implementing the service administrated by console 102.

In some embodiments, console 102 may determine a service portion priority for each service portion implemented on the affected computer systems and command replication of service portions based on the determined service portion priority. The service portion priority level may be based on whether the service portion is stored in more than one location. Console 102 may determine an order of replication of service portions based on the event priority level. In some embodiments, console 102 may also determine a rate of replication for service portions based on an event priority level. Console 102 may select a destination location for replicated state information based on a proximity to the location of the affected computer system. In some embodiments console 102 may also communicate with BMS 112 and request BMS 112 to delay initiating a BMS control function in order to permit more time to replicate data from an affected computer system implementing a service administrated by console 102. In some embodiments, console 102 may command deletion of replicated data in response to receiving an event signal from BMS 112 indicating a false alarm. Console 102 may consult a directory to determine if the service it is administrating is implemented on one of the affected computer systems identified in the event signal from BMS 112.

Figure 1E:
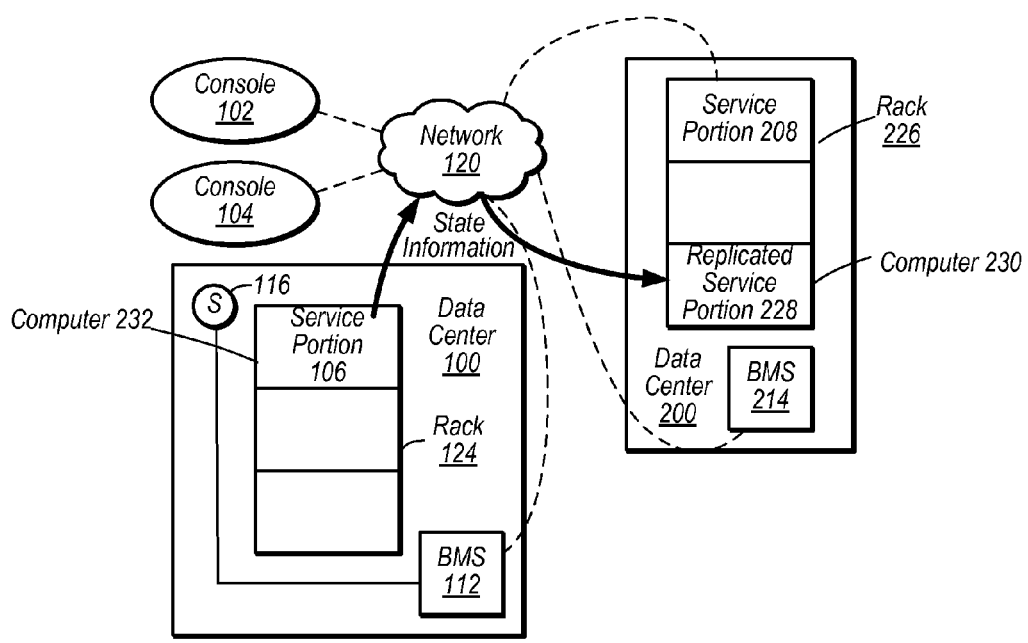

FIG. 1E illustrates computer system 232 implementing service portion 106 in data center 100 replicating state information to replicated service portion 228 implemented on computer system 230 located in data center 200 according to some embodiments. The replicated state information may be sent from computer 232 implementing service portion 106 in data center 100 through network 120 to computer system 230 implementing replicated service portion 228 located in data center 200. In some embodiments, the replicated state information may be data stored in computer 232 and associated with service portion 106. In some embodiments, the replicated state information may be state information related to a process currently running on computer system 232 and used in implementing service portion 106. In some embodiments, replicated service portion 228 may be a process implementing a network based service and the process may be implemented with the replicated state information from service portion 106. In some embodiments, replicated service portion 228 may be a service portion of a network based service storing data for the network based service. Replicated service portion 228 may comprise data replicated from service portion 106. In some embodiments, console 102 may replicate service portions to another computer system in data center 100 or to a different data center.

Figure 2:
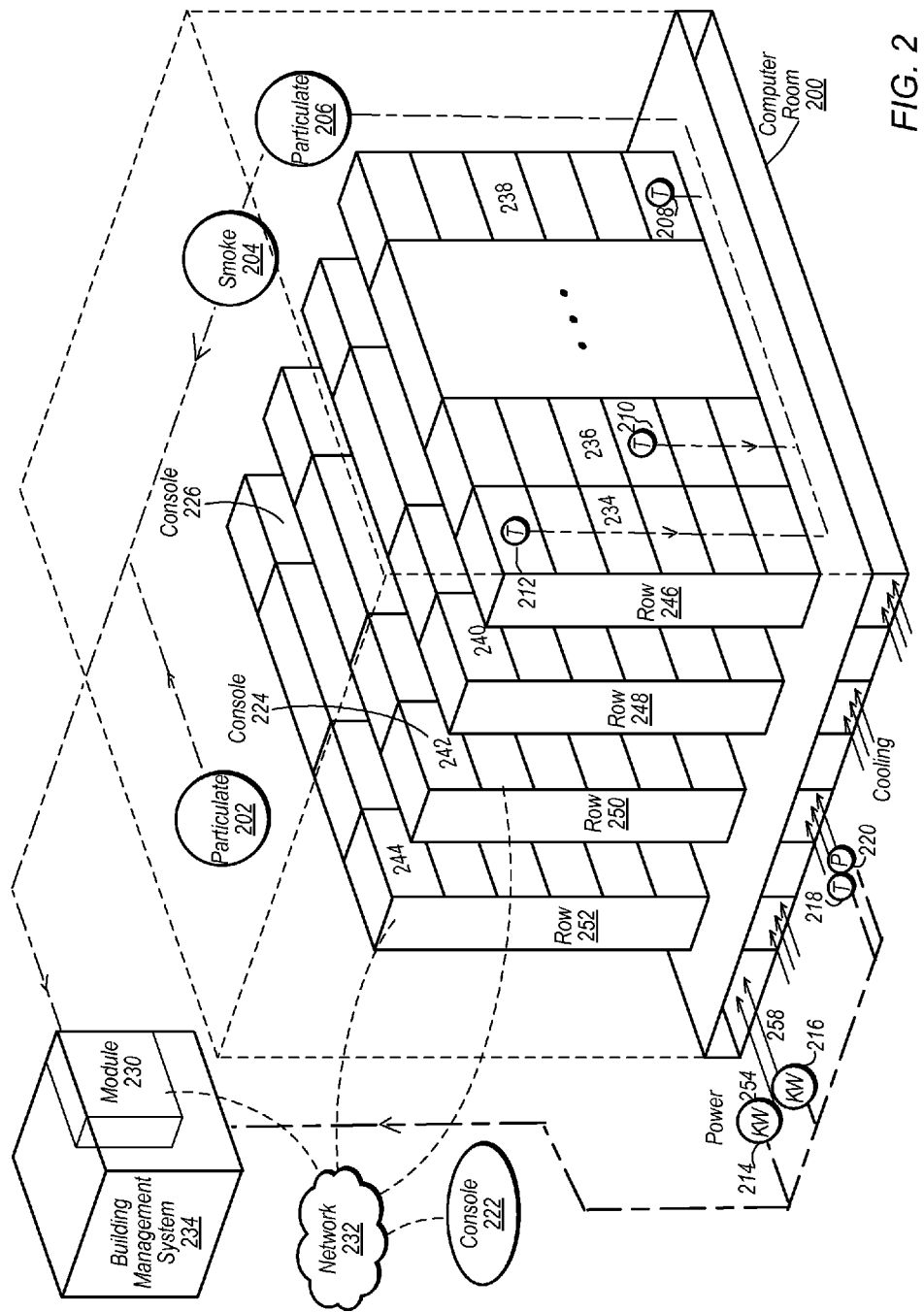
FIG. 2 illustrates a computer room including a BMS coupled to sensors and console systems via a communication network, according to some embodiments.

FIG. 2 illustrates computer room 200 comprising rows 246, 248, 250, and 252 of rack mounted computer systems; sensors 202, 204, 206, 208, 210, 212, 214, 216, 218, and 220; building management system (BMS) 234; network 232; and console systems 222, 224, and 226 according to some embodiments. Row 246 comprises racks 234, 236, and 238. Temperature sensors 208, 210, and 212 may be coupled to computer systems located in racks 234, 236, and 238. Particulate sensor 206 may be mounted above rack 238 and detect particulate matter. Particulate matter may indicate a loss of air filtration or a fire in computer room 200. Smoke sensor 204 may be mounted above rack 238 and detect smoke in computer room 200. Particulate sensor 202 may be mounted above rack 244 and may indicate a loss of air filtration or a small fire close to rack 244. Temperature sensor 218 may be mounted in an air flow of an underfloor plenum supplying cooling air to racks comprising row 250. A high temperature may indicate a problem associated with the cooling air system. For example, a high temperature in the cooling air supply may indicate a failure of a chiller supplying cooling air or a failure of an air mover in the cooling air supply. A high temperature in the cooling air supply to a particular row may also indicate that the air flow to rows 246, 248, 250, and 252 is out of balance so that some rows receive preferential flow, while other rows receive inadequate flow. Temperature sensors 208, 210, and 212 coupled to computer systems in racks 234, 236, and 238 may indicate a server malfunction, recirculation of cooling air in the zone associated with the sensor, or some other event causing a high temperature in racks 234, 236 or 238. Pressure sensor 220 may be coupled to a duct providing cooling air to racks comprising row 250. A pressure deviation may indicate an issue with cooling air flow such as loss of a blower or a restriction in the duct supplying cooling air to row 250. Power sensors 214 and 216 are coupled to power feeds 254 and 258 that feed the racks in rows 246-252. Power sensors 214 and 216 may indicate a loss of a redundant or primary power feed to the racks in rows 246-252. Sensors 202, 204, 206, 208, 210, 212, 214, 216, 218, and 220 are all coupled to BMS 234 and send sensor signals to BMS 234.

BMS 234 is connected through network 232 to console systems 222, 224, and 226. BMS 234 communicates with console systems 222, 224, and 226 through console communication module 230 that is connected to network 232. Sensor signals may be sent wirelessly or through wires to BMS 234. In some embodiments, console systems 222, 224, and 226 may comprise different Application Program Interfaces that require BMS 234 to comprise different console communication modules 230 to communicate with each respective console system. In some embodiments, console systems 222, 224, and 226 may require different plug-ins for BMS 234 to be able to communicate with respective console systems. In some embodiments, other communication interfaces may allow BMS 234 to communicate with console systems 222, 224, and 226. BMS 234 may comprise multiple console communication modules configured to be able to communicate with multiple console systems where the multiple console communication systems comprise different communication interfaces.

Each of console systems 222, 224, and 226 may administrate a service implemented on computer systems in rows 246, 248, 250, and 252 of computer room 200 or may administrate a service that is not implemented on any of the computer systems in computer room 200. Console system 224 may administrate a service implemented on the same computer system in rack 242 that is implementing console system 224.

In some embodiments, temperature sensors 208, 210, and 212 may be part of the computer system mounted in racks 234, 236, and 238 and may communicate with BMS 234 via network 232. In some embodiments, temperature sensors 208, 210, and 212 may be sensing devices coupled to computer systems located in racks 234-238.

In some embodiments, BMS 234 may be located in computer room 200. In some embodiments BMS 234 may be located in a central location of a data center and manage operation for multiple computer rooms.

Data center 100 and 200 described in FIGS. 1A-E may include computer room 200. Also similar components depicted in both FIGS. 1A-E and FIG. 2 may represent the same components. For example, smoke sensor 204 may be equivalent to smoke sensor 116, described in FIGS. 1A-E, console systems 222, 224, and 226 may be equivalent to console systems 102 and 104 described in FIGS. 1A-E, any of racks 234, 236, 238, 240, 242, or 242 may be equivalent to racks 124 and 226 described in FIGS. 1A-E, network 232 may be equivalent to network 120 described in FIGS. 1A-E, and BMS 234 may be equivalent to either BMS 112 or BMS 214 described in FIGS. 1A-E. In addition, any other components described in FIG. 2 may also be a part of data center 100 or data center 200 as described in FIGS. 1A-E.

Figure 3:
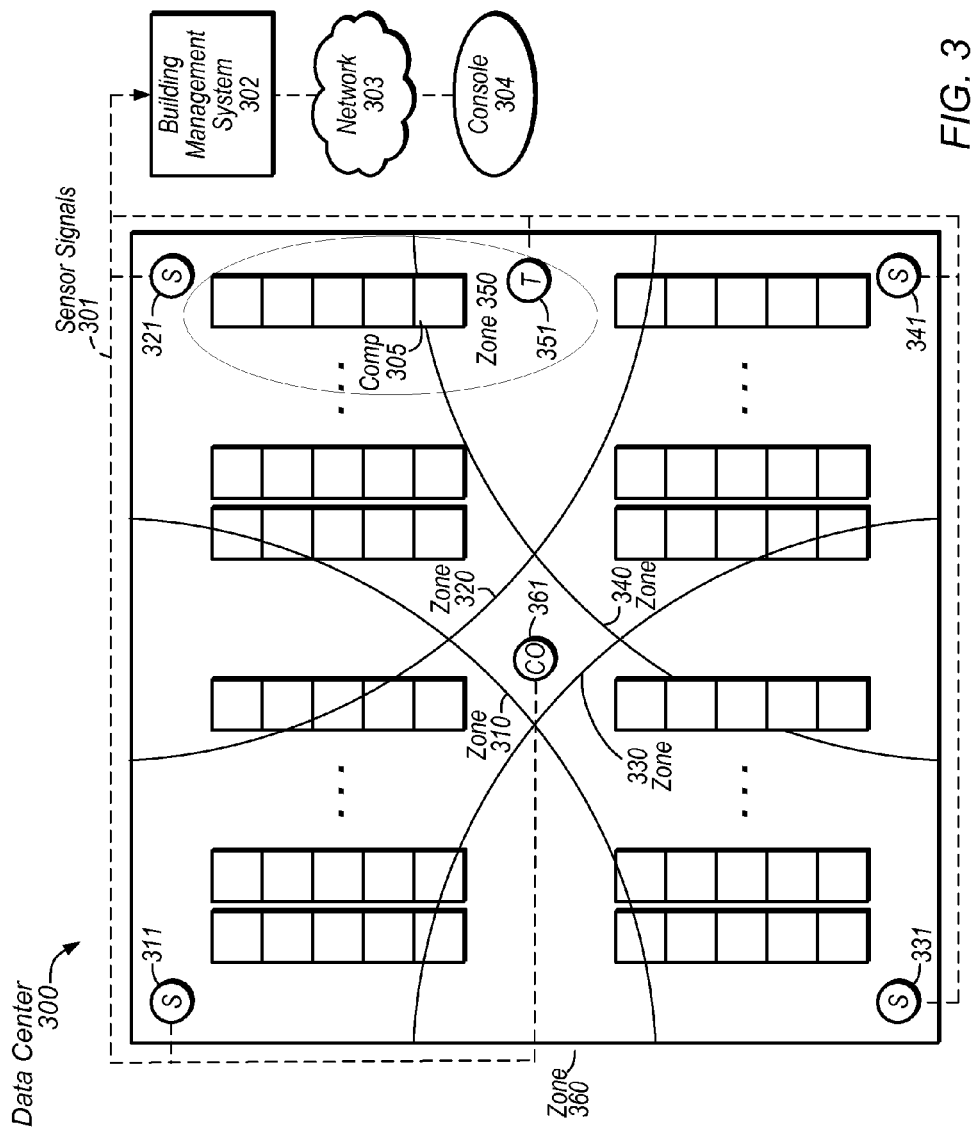
FIG. 3 illustrates a schematic view of a data center including various zones associated with sensors, according to some embodiments.

FIG. 3 illustrates a schematic view of data center 300 comprising zones 310, 320, 330, 340, 350, and 360 and sensors 311, 321, 331, 341, 351, and 361 according to some embodiments. Zone 350 represents an area covered by temperature sensor 351. Zones 310, 320, 330, and 340 represent areas covered by smoke detectors 311, 321, 331, and 341. Zone 360 represents an area covered by carbon monoxide sensor 361 located in the center of data center 300. The sensors in each zone may be coupled to building management system (BMS) 302.

Data center 300 shows arrangements of zones in a data center based on areas covered by different sensors. Data centers 100 and 200 described in FIGS. 1A-E and computer room 200 described in FIG. 2 may include similar zone arrangements as the arrangements depicted in FIG. 3. Also, other zone arrangements may be used to detect data center events.

As can be seen in FIG. 3, multiple zones may overlap and a particular computer system may be located in several different zones. For example, computer system 305 may be located in zone 320, zone 340, zone 350, and zone 360. In some embodiments, BMS 302 may send additional event signals via network 303 to console computer system 304 when BMS 302 receives more than one sensor signal affecting the same computer system located in multiple zones covered by multiple sensors.

For example, carbon monoxide sensor 361 may first detect carbon monoxide and send a sensor signal to BMS 302. BMS 302 may determine computer systems in zone 360 associated with carbon monoxide sensor 361 are affected computer systems. BMS 302 may determine that computer system 305 is located in zone 360 based on computer location information stored in a directory. BMS 302 may send an event signal to console computer system 304 commanding console computer system 304 to replicate a service portion implemented on computer system 305 to a separate computer system based on determining that computer system 305 is an affected computer system. BMS 302 may command a low replication rate.

The fire causing carbon monoxide sensor 361 to detect carbon monoxide may spread. Smoke sensor 341 may detect smoke and send a sensor signal to BMS 302. BMS 302 may determine computer systems in zone 340 associated with smoke sensor 340 are affected computer systems. BMS 302 may determine that computer system 305 is located in zone 340 based on computer location information stored in the directory. BMS 302 may also determine that the sensor signal received from smoke sensor 341 is a second sensor signal affecting the same particular computer system located in multiple zones. BMS 302 may send a second event signal to console 304 in response to determining that the sensor signal received from smoke sensor 341 is a second sensor signal sensor affecting computer system 305 located in multiple zones. In some embodiments, BMS 302 may send an additional event signal to console 304 commanding a faster replication rate in response to determining the sensor signal is a second sensor signal affecting computer system 305.

In some embodiments, BMS 302 may determine an event priority level and send an event signal to all console systems administrating services implemented on computer systems in data center 300. For example, BMS 302 may send an event signal to console 304 commanding replication of instances of state information stored on computer system 305. The event signal may also include an event priority. In response to receiving the event signal console 304 may determine that it is implementing a service portion of its service on computer system 305 and command replication of the instances of state information stored on computer system 305.

In some embodiments, an event priority may depend on the number and type of sensor signals received by BMS 302. For example, BMS 302 may assign a low event priority to affected computer system 305 located in multiple zones if BMS 302 receives a temperature signal from temperature sensor 351 alone. BMS 314 may assign a medium priority to affected computer system 305 located in multiple zones if BMS 302 receives both a carbon monoxide signal from carbon monoxide sensor 361 and a smoke signal from smoke sensor 341, where zones 360 and 340 associated with carbon monoxide sensor 361 and smoke sensor 341 both include computer system 305. BMS 302 may assign a high event priority to affected computer system 305 located in multiple zones if BMS 302 receives a smoke signal from both smoke sensors 321 and 341, a carbon monoxide signal from carbon monoxide sensor 361, and a temperature signal from temperature sensor 351, where computer system 305 is in a location covered by zones 320, 340, 350, and 360 that are associated with sensors 321, 341, 351, and 361. In some embodiments BMS 302 may assign various event priority levels in response to receiving various different combinations of sensor signals.

In some embodiments, console system 304 may command replication of service portions implemented on affected computer system 305 located in multiple zones in a particular priority order based on an event priority. Console 304 may also command a particular rate of replication based in part on an event priority level. For example, if the event priority is low there may be plenty of time to replicate instances of state information stored on affected computer system 305. Console system 304 may command a slow replication rate. However, if an event priority is high, possibly indicating a fire, console system 304 may order a fast replication because there may be limited time to replicate instances of state information stored on affected computer system 305 before the computer system ceases to operate.

In some embodiments, data centers 100 and 200 described in FIGS. 1A-E may be a data center 300 as described in FIG. 3. Smoke sensor 116 described in FIGS. 1A-E may be any of sensors 311, 321, 331, 341, 351, and 361 described in FIG. 3. BMS 302 may be either BMS 112 or BMS 214 as described in FIGS. 1A-E. In addition, computer room 200 described in FIG. 2 may be a data center 300 and data center 300 may comprise one or more computer rooms 200.

Figure 4A:
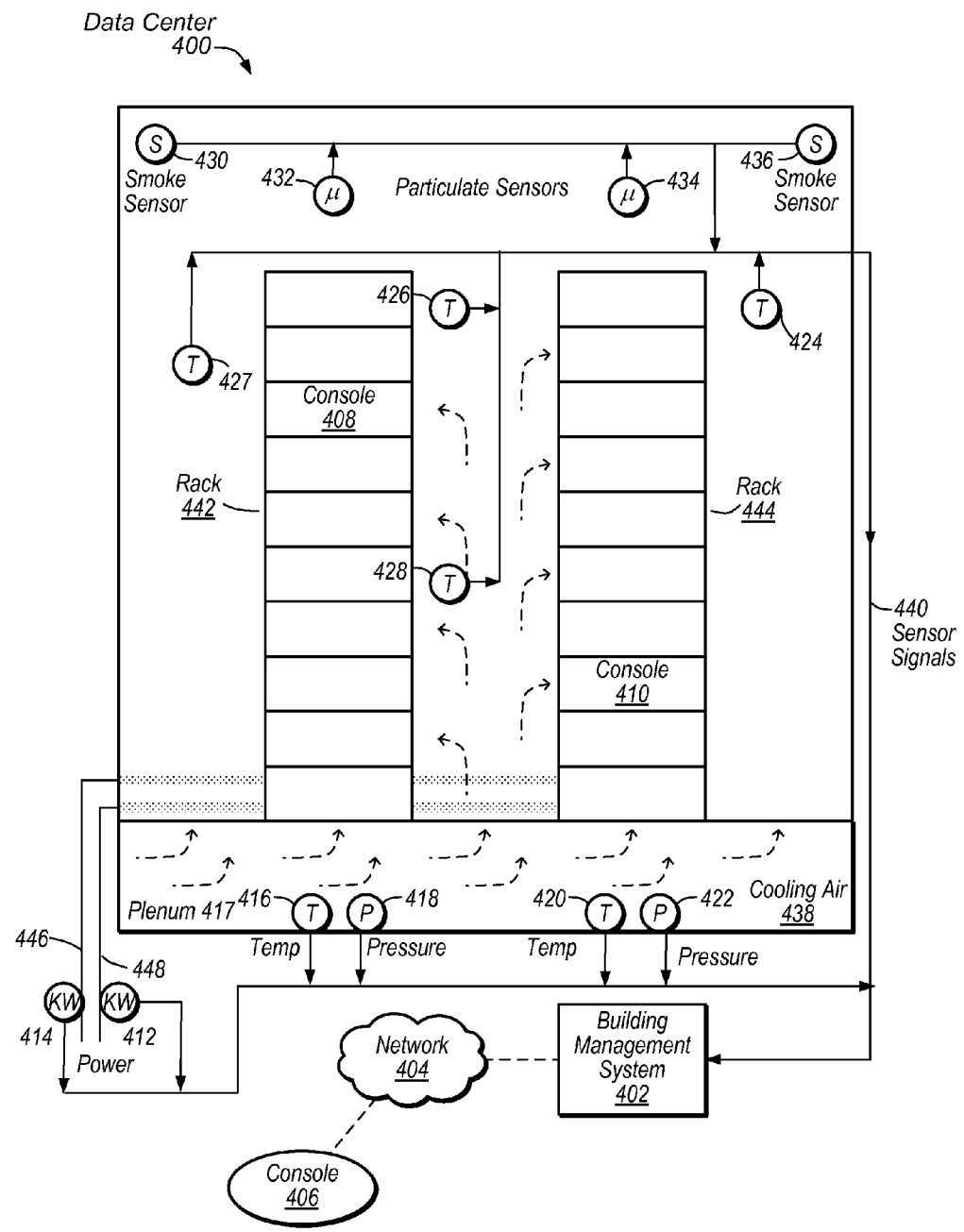
FIG. 4A-C illustrate some example embodiments of a data center comprising racks and sensors coupled to a BMS.
Figure 4B:
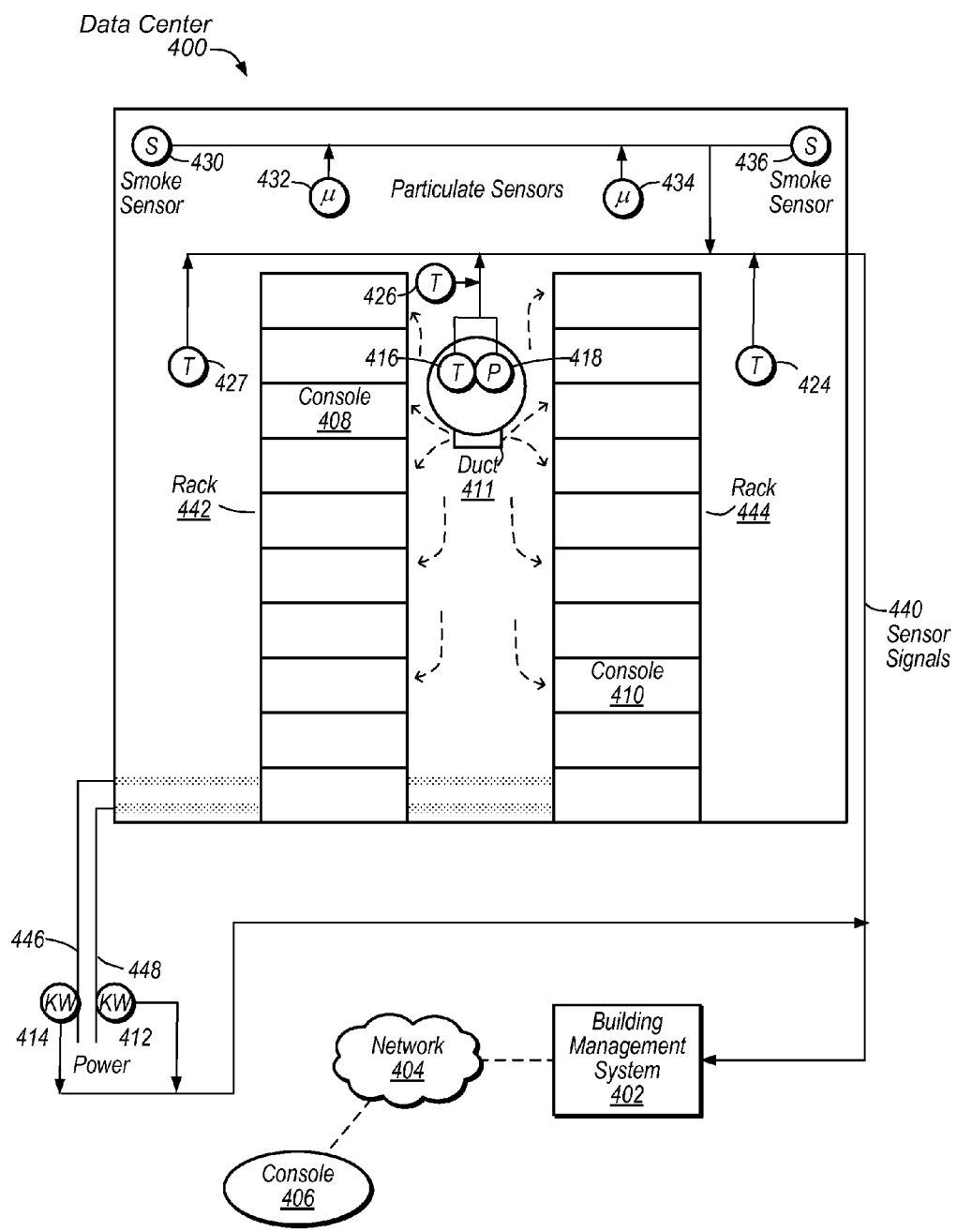
Figure 4C:
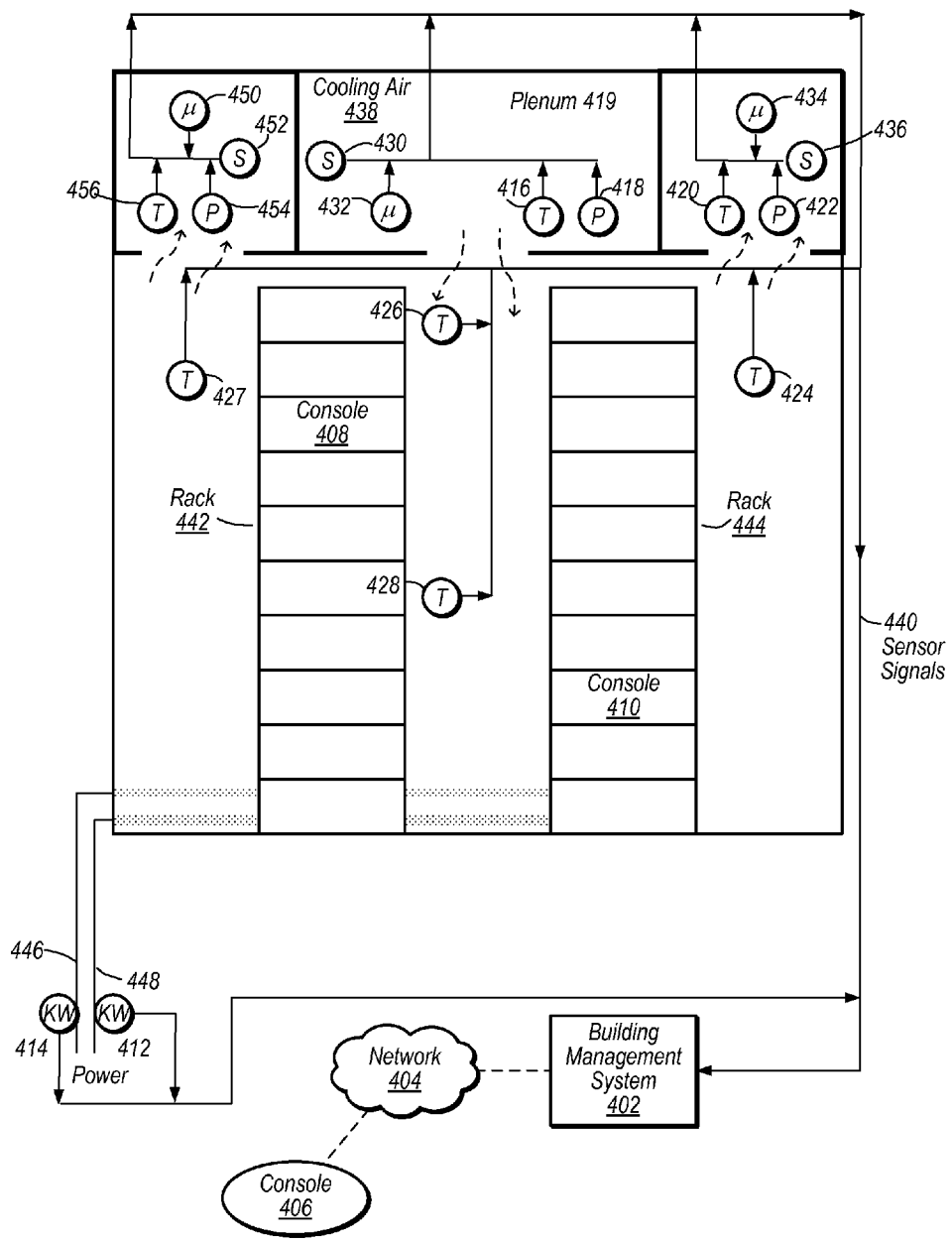

FIGS. 4A-C illustrate racks 442 and 444 and various sensor arrangements according to some embodiments. FIG. 4A illustrates example sensor placement in a cooling system arrangement utilizing an underfloor plenum, FIG. 4B illustrates example sensor placement in a cooling system arrangement using overhead ducts, FIG. 4C illustrates an example sensor placement in a cooling system arrangement using an overhead plenum. Some embodiments may use different cooling system arrangements and sensor placements.

FIG. 4A illustrates racks 442 and 444 in data center 400 and various sensors according to some embodiments. Racks 442 and 444 are located in data center 400. Smoke sensors 430 and 436 may be mounted from the ceiling of data center 400 in opposite corners of a computer room. Particulate sensors 432 and 434 may be located above racks 442 and 444. Temperature sensors 426 and 428 may be located in computer systems mounted in racks 442 and 444 and may measure the temperature of heat producing components mounted in racks 442 and 444. Temperature and pressure sensors 416, 418, 420, and 422 may be mounted in underfloor plenum 417 supplying cooling to racks 442 and 444. Temperature and pressure sensors 416, 418, 420, and 422 may indicate a cooling system issue to BMS 402. Temperature sensors 424 and 427 may be located in an aisle that receives exhaust air from racks 442 and 444 and may indicate a high temperature in racks 442 and 444. Power sensors 412 and 414 may be coupled to power feeds 446 and 448 supplying power to racks 442 and 444. Power sensors 412 and 414 may indicate a loss of power on power feeds 446 and 448. Console systems 408 and 410 may be running on computer systems in racks 442 and 444. Console system 406 may be running on a computer system located in a separate location. BMS 402 may communicate with console systems 406, 408, and 410 via network 404. Sensors 412, 414, 416, 418, 420, 422, 424, 426, 427, 428, 430, 432, 434, and 436 may communicate with BMS 402 through a hard wired connection, a wireless connection, via network 404, or in another manner.

Data center 400 described in FIG. 4A is a detailed view of a data center with cooling air 438 supplied through underfloor plenum 417 and shows placement of sensors in a representative portion of a data center. The data centers described in FIGS. 1A-E and FIG. 3, and computer room 200 described in FIG. 2 may contain the same or similar sensors and arrangement of sensors as shown in FIG. 4A.

In some embodiments BMS 402 may assign a low event priority to a loss of a redundant system such as power feed 448. BMS 402 may send an event signal to console systems 406, 408, and 410 indicating a low event priority. Console system 406 may command a slow rate of replication for non-redundant instances of state-information in response to receiving an event signal with an event priority corresponding to a loss of a redundant power system such as power feed 448.

In some embodiments BMS 402 may send a subsequent event signal indicating a false alarm. BMS 402 may be configured to identify a first knock and second knock to determine that a sensor signal is a real indication of a data center event. For example, particulate sensor 432 may detect a high concentration of particulate matter for a short period of time and send a sensor signal to BMS 402. If particulate sensor 432 returns to normal after the short period of time and does not detect a subsequent high concentration of particulate matter, BMS 402 may determine that the initial sensor signal from particulate sensor 432 was a false alarm. In some embodiments BMS 402 may send an initial event signal to console systems 406, 408, and 410. BMS 402 then may send a subsequent event signal to console systems 406, 408, and 410 to indicate a false alarm.

In some embodiments BMS 402 may determine that one of console systems 406, 408, and 410 implement a portion of their respective services on a computer system located in the zone covered by particulate sensor 432. In this case, BMS 402 may selectively send an event signal to the particular console system that administrates a service implemented on an affected computer system. In the above example, BMS 402 would send a subsequent false alarm signal to the particular console system that administrates a service implemented on a computer system located in the affected zone.

In some embodiments temperature sensors 424, 426, and 428 may be part of one or more computer system mounted in racks 442 and 444. Temperature sensors 424, 426, and 428 may communicate with BMS 402 through network 404.

FIG. 4B illustrates a variation of data center 400 as described in FIG. 4A that utilizes duct 411 to supply cooling air to racks 442 and 444 instead of an underfloor plenum. Temperature sensor 416 and pressure sensor 418 are located in duct 411 and measure the temperature and pressure of cooling air flowing through duct 411. Temperature sensor 426 is located in the space between racks 442 and 444 and measures the temperature of cooling air between racks 442 and 444. Temperature sensors 424 and 427 are located in aisles that receive exhaust air from racks 442 and 444 and may indicate a high temperature in racks 442 and 444. In some embodiments other air cooling system arrangements may be utilized.

Data center 400 described in FIG. 4B is a detailed view of a data center with cooling air supplied through duct 411 and shows placement of sensors in a representative portion of a data center. The data centers described in FIGS. 1A-E and FIG. 3, and computer room 200 described in FIG. 2 may contain the same or similar sensors and arrangement of sensors as shown in FIG. 4B.

FIG. 4C illustrates a variation of data center 400 as described in FIGS. 4A-B that utilizes an overhead plenum 419 instead of an underfloor plenum as illustrated in FIG. 4A or an overhead duct as utilized in FIG. 4B. Temperature and pressure sensors 416 and 418 function in a similar manner as in FIG. 4A. Temperature and pressure sensors 416 and 418 may indicate a loss of cooling air. Smoke sensor 430 and particulate sensor 432 are located in plenum 419 supplying cooling air 438 to racks 442 and 444 and may indicate an issue in the cooling air supply to racks 442 and 444.

Temperature sensors 420 and 456, pressure sensors 454 and 422, smoke sensors 436 and 452, and particulate sensors 434 and 450 are located in a portion of plenum 419 that accepts exhaust air from racks 442 and 444. These sensors may indicate an issue in racks 442 or 444. For example, temperature sensors 427 and 456 located in the path of exhaust air from rack 442 may indicate high temperatures, temperature sensors 420 and 424 located in the path of exhaust from rack 442 may indicate normal temperatures, and temperature sensors 416, 426, and 428 located in the path of supply cooling air may indicate normal temperatures. BMS 402 may determine that one or more computer systems located in rack 442 is running at a high temperature based on the temperatures from temperature sensors 427, 456, 416, 426,428, 420, and 424 that indicate all data center cooling temperatures are at normal levels except the temperatures in the path of exhaust air from rack 442. In response to determining that one or more computer systems located in rack 442 is running at a high temperature based on the temperature sensor measurements, BMS 402 may generate an event signal to console computer system 408 administrating one or more portions of a network-based service implemented on computer systems located in rack 442. In response to receiving the event signal, console computer system 408 may command replication of state information from the one or more computers implementing a portion of the network-based service in rack 442 to separate computers in rack 444. In some embodiments state information may be replicated to computer systems in another data center or to computer systems in a different part of the same data center. State information may be replicated to a location not associated with a data center.

Data center 400 described in FIG. 4C is a detailed view of a data center with cooling air 438 supplied through overhead plenum 419 and shows placement of sensors in a representative portion of a data center. The data centers described in FIGS. 1A-E and FIG. 3, and computer room 200 described in FIG. 2 may contain the same or similar sensors and arrangement of sensors as shown in FIG. 4C.

Figure 5:
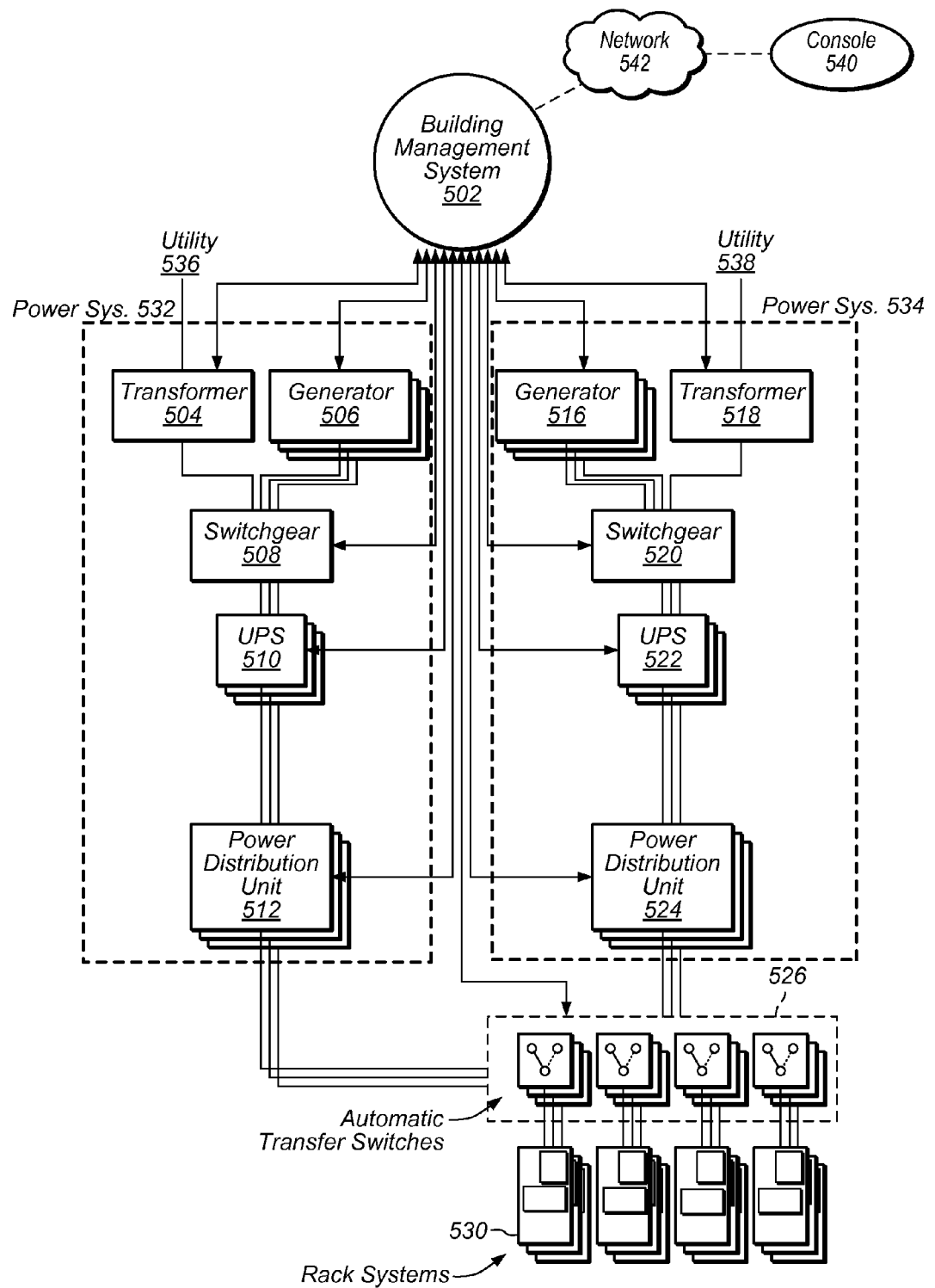
FIG. 5 illustrates data center power distribution systems coupled to a BMS, according to some embodiments.

FIG. 5 illustrates a building management system (BMS) 502 coupled to various power system sensors according to some embodiments and connected to console 540 via network 542. BMS 502 is coupled to power system sensors located in transformers 504 and 518, generators 506 and 516, and switchgear 508 and 520. BMS 502 receives sensor signals from sensors coupled to the transformers, generators, and switchgear. The sensors are configured to indicate a failure of the component they are associated with. Rack system 530 is coupled to redundant power systems 532 and 534. Each power system has a separate utility feed and comprises a transformer, a generator, switchgear, an uninterrupted power supply, and a power distribution unit. Power systems 532 and 534 both couple to automatic transfer switches 526. An automatic transfer switch automatically switches power systems to ensure rack system 530 does not lose power. Generators 506 and 516 supply power in the event that a redundant utility feed to power system 532 and 534 is not available.

Power systems 532 and 534 may supply power to the data centers and computer room described in FIGS. 1-4. For example, power feeds 254 and 258 depicted in FIG. 2 may comprise power systems 532 and 534. Also, power feeds 446 and 448 depicted in FIG. 4 may comprise power systems 532 and 534. Rack systems 530 depicted in FIG. 5 may comprise any of the racks described in FIGS. 1-4.

In various situations redundancy may be lost. A failure in transformers 504 or 518, or a failure in switchgears 508 or 520 may leave rack system 530 without a backup power system. Also a total power outage of both utility feeds may leave rack system 530 dependent on generators 506 and 516 for power. Generators 506 and 516 may have limited quantities of fuel available and may be able to provide power for a limited amount of time.

In some embodiments BMS 502 may assign various event priority levels depending on the degree of lost redundancy and send an event signal comprising an event priority level to console 540. For example, BMS 502 may assign a low event priority to a loss of utility feed to power system 532 as long as utility feed to power system 534 is active and both generators 504 and 516 are available. In another case, BMS 502 may assign a medium event priority level to a loss of power system 532 due to a loss of utility feed 536 and a sensor signal showing that generators 506 and 516 are not available. In another case, BMS 502 may assign a high event priority if both utility feeds 536 and 538 are lost to power systems 532 and 534 and rack system 530 is completely dependent on generators 506 and 518 for power. In some embodiments various other combinations may result in assignment of other event priority levels.

In some embodiments, console system 540 may selectively command replication for non-redundantly implemented service portions in response to receiving an event signal indicating a low event priority level. In other embodiments, console system 540 may not command replication until the event priority level passes a threshold. For example, console system 540 may not command replication of instances of state information implemented on an affected computer system in response to an event priority level corresponding to a loss of backup utility feed. However, console system 540 may command rapid replication of non-redundantly implemented service portions implemented on an affected computer system in response to an event priority level indicating a total loss of utility feed and reliance on generator power. In other embodiments console system 540 may make other replication decisions based on event priority.

Figure 6:
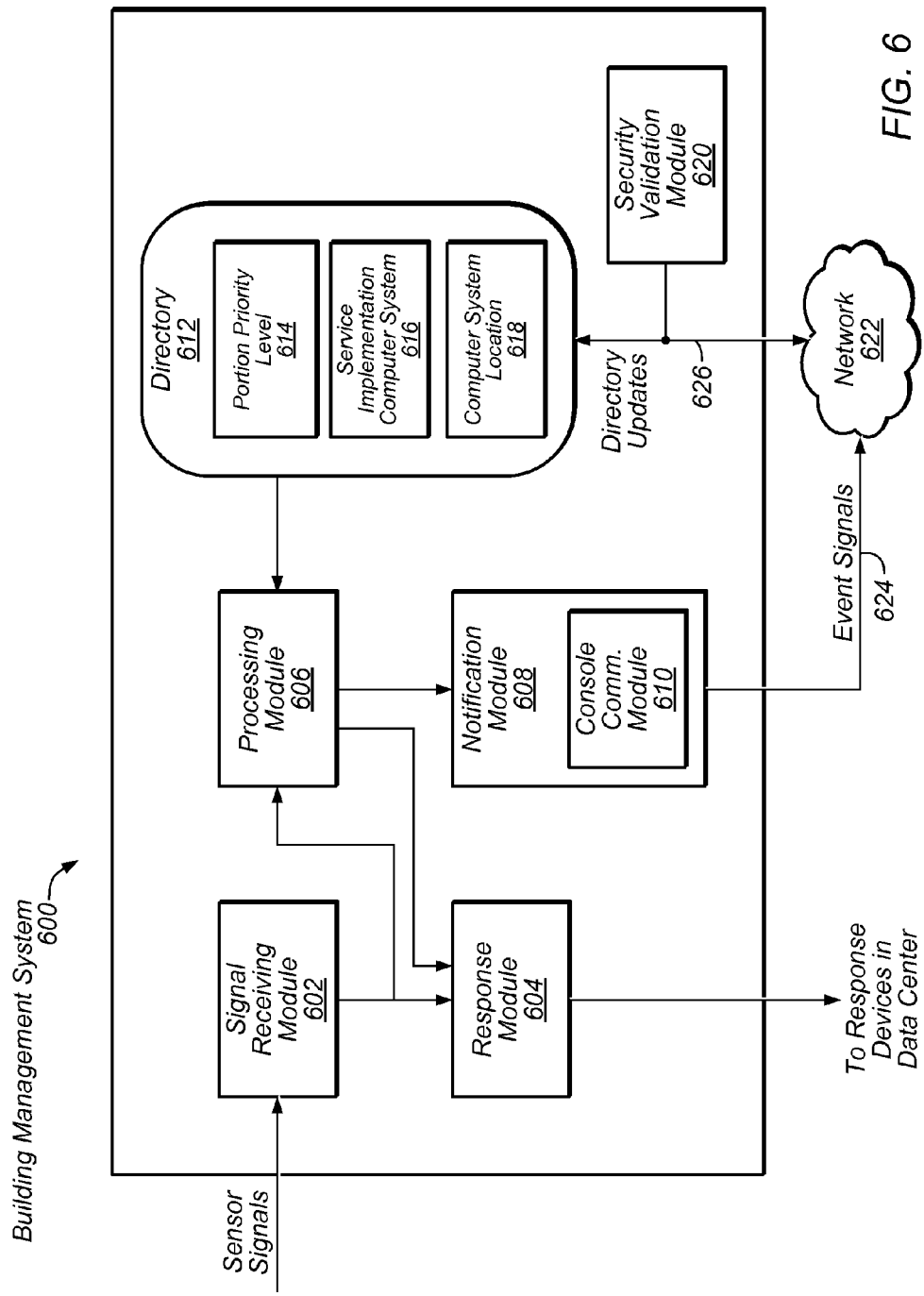
FIG. 6 illustrates a BMS, according to some embodiments.

FIG. 6 illustrates modules used by a building management system (BMS) 600 to respond to receipt of sensor signals according to some embodiments. BMS 600 comprises signal receiving module 602, response module 604, processing module 606, notification module 608, directory 612, and security validation module 620. BMS 600 receives sensor signals from sensor devices and sends event signals over network 622. BMS 600 also sends BMS control function signals to response devices located in a data center that it manages. In some embodiments response devices may include sprinkler systems, fire suppression systems, fire alarm systems, air conditioning systems, generators, or other components of a data center.

BMS 600 may represent any of the BMS systems described in FIGS. 1-5. For example, BMS 600 may represent: BMS 112 in FIGS. 1A-E, BMS 214 in FIGS. 1A-E, BMS 234 in FIG. 2, BMS 302 in FIG. 3, BMS 402 in FIG. 4, and/or BMS 502 in FIG. 5.

Signal receiving module 602 may receive sensor signals from environmental sensors located in a data center associated with BMS 600. Signal receiving module may notify response module 604 of the receipt of a particular sensor signal associated with a particular type of sensor in a particular location in a data center. Response module 604 may determine the appropriate BMS control function to activate in response to the sensor signal indicating a particular sensor type in a particular location.

For example, a sensor signal received by signal receiving module 602 may originate from a carbon monoxide sensor in a particular zone of a data center. Response module 604 may determine the proper response is to activate an evacuation alarm. Response module may also determine a particular evacuation alarm associated with the particular zone covered by the carbon monoxide alarm from a plurality of evacuation alarms for a plurality of zones in a data center. In response to determining the proper BMS control function and location to activate, response module 604 may activate the evacuation alarm for the particular zone. In some embodiments response module may not include logical operations and may be electro-mechanical such that every time a signal for a particular sensor is received a particular BMS control function is activated. In some embodiments, response module 604 may include some logical capabilities and be in communication with processing module 606.

In embodiments where response module 604 is in communication with processing module 606, response module 604 may alter BMS control functions based at least in part on instructions from processing module 606. For example, processing module 606 may determine that a non-redundant service portion with a high priority is located in a particular zone affected by a sensor signal. Processing module 606 may instruct response module 604 to delay activation of a BMS control function for a period of time to allow for replication of instances of state information stored on an affected computer system located in the affected zone. In other embodiments, to prevent defeating a safety system, response module 604 may not respond to instruction from processing module 606 to delay activation of a BMS control function. In some embodiments BMS 600 may receive feedback communications from console computer systems over network 622 requesting delayed activation of a BMS control function. Processing module 606 may evaluate a request from a console computer system to delay activation of a BMS control function and may instruct response module 604 to delay activation based on a request from a console computer system.

Processing module 606 may receive notifications sent from signal receiving module 602 to response module 604. As described above the notifications sent from signal receiving module 602 to response module 604 may identify a particular type of sensor and a particular location. Processing module 606 may also communicate with directory 612. Directory 612 comprises computer system location information 618, service implementation computer system information 616 and service priority information 614. Processing module 606 may determine an affected computer system by using the location information included in the notification from signal receiving module 602 and the computer system location information 618 in directory 612 to determine all the computer systems located in an affected zone. BMS 600 may send an event signal to all services possibly implemented in the data center associated with BMS 600. The services may then determine if they are implemented on one of the identified affected computer systems.

In some embodiments, processing module 606 may consult directory 612 to obtain service implementation computer system information 616. Service implementation computer system information 616 may link a particular computer system with a service implemented by the computer system. Processing module 606 may use the location information in the notification from signal receiving module 602 along with the computer system location information 618 in directory 612 to determine all affected computer system. Processing module 606 may then use service implementation computer system information 616 in directory 612 to determine each service implemented on each affected computer system.

In some embodiments, processing module 606 may consult directory 612 to determine a service priority after determining the services implemented on affected computer systems. Service priority information 614 may include a priority for each service portion implemented by a service.

In some embodiments, processing module 606 may instruct notification module 608 to send an event signal to services that comprise service portions implemented on affected computer systems that have a service portion priority above a threshold. In some embodiments, the service portion priority may be based at least in part on whether the service portion is redundantly implemented. Redundant implementation means that the service portion is stored in more than one computer system, so that the loss of any one computer system does not result in loss of the state information comprising the particular service portion. In some embodiments redundant service portions may be implemented on different computer systems in the same physical location. In some embodiments redundant service portions may be implemented on similar types of computer systems, such as similar manufacturer or operating system. In other embodiments, redundant service portions may be implemented on computer systems in different physical locations or computer systems running different operating systems or manufactured by different manufactures.

In some embodiments, redundantly implemented service portions may receive a lower service portion priority than non-redundantly implemented service portions. For example, the network through which state information must flow to replicate service portions may be constrained. A low priority may be assigned to redundantly implemented service portions, so that the redundantly implemented service portions are replicated during periods where network traffic is low. In some embodiments, redundantly implemented service portions may not be replicated at all or the state information may be replicated from a separate replica of the service portion that is located in a separate location that is not experiencing constraints on network traffic.

In some embodiments, redundantly implemented service portions may receive a higher service portion priority than non-redundantly implemented service portions. For example, the state information comprising a redundantly implemented service portion may be important state information and the network based service implementing the redundantly implemented service portion may include an agreement with users of the service to guarantee a very high level of reliability requiring a certain number of redundant sets of state information at all times. In order, to fulfill the terms of the agreement guaranteeing high reliability, a redundant service portion may receive a high service portion priority to ensure the service portion is replicated quickly and compliance with the agreement guaranteeing reliability is met. In some embodiments, this may require the computer system implementing the service portion to halt other processing operations to give priority to replication of the redundantly implemented service portion. In some embodiments, this may require a network connecting the computer system implementing the redundantly implemented state information to a destination computer system to allocate additional bandwidth for replication from the computer implementing the redundantly implemented state information to the destination computer system.

In some embodiments, processing module 606 may determine a replication order based on service portion priority. For example, processing module 606 may order higher priority service portions to be replicated before lower priority service portions on the same affected computer system. Processing module 606 may also determine an order of replication for service portions implemented on multiple affected computer systems.

In some embodiments, processing module 606 may determine a false alarm. Processing module 606 may determine a "first knock" when a sensor signal is received from signal receiving module 602. Processing module 606 may wait a predetermined amount of time to receive a "second knock" in order to determine the event signal indicates an actual data center event. For example, a smoke detector may fail and momentarily send a sensor signal indicating smoke. However, if the sensor signal does not persist, processing module 606 will not receive the "second knock." In response to not receiving the "second knock" within the predetermined amount of time, processing module 606 may determine that the original smoke sensor signal was a false alarm.

Notification module 608 receives instructions from processing module 606 and sends event signals 624 using console communication module 610 and network 622. As discussed above, services are implemented on computer systems that may be located throughout a data center or multiple data centers. Each computer system implements a service portion. A console system administrates the computer systems implementing service portions of a service. Console communication module 610 may determine the proper address and protocol to allow a notification to be sent to a particular console system. In some embodiments, notification module 608 may comprise multiple console communication modules, where each console communication module is configured to communicate with a particular service. Notification module 608 generates event signals based on instructions received from processing module 606 and acquires protocol and address information from console communication module 610. Notification module 608 then sends the event signal to the affected console system over network 622.

In some embodiments, directory 612 may receive directory updates 626 through network 622. Directory updates may include computer system location information, service implementation computer system information, service priority information or other updates. In some embodiments security validation module 620 authenticates the source of an update before allowing an update to pass into directory 612.

Figure 7:
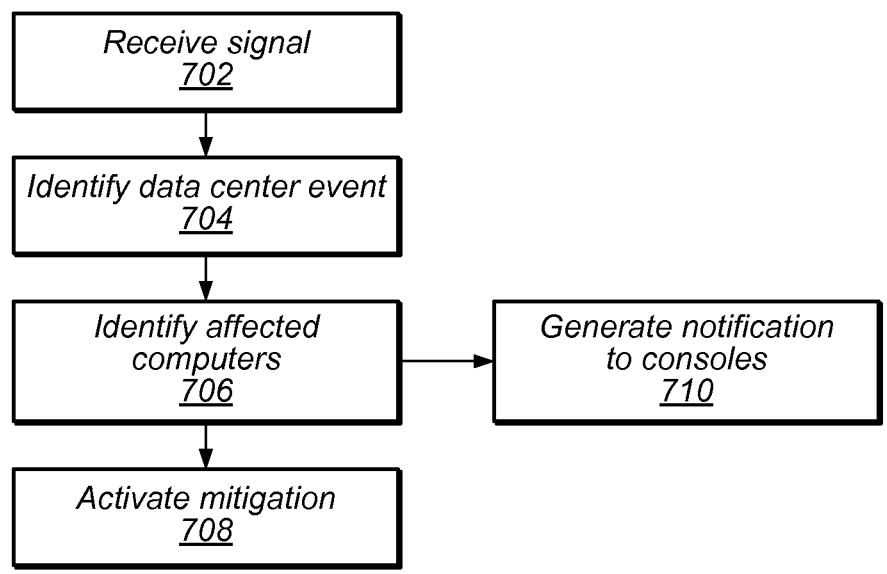
FIG. 7 illustrates a BMS responding to a data center event, according to some embodiments.

FIG. 7 illustrates operations of a building management system (BMS) in response to receiving a sensor signal from environmental sensors mounted in a data center according to some embodiments. The BMS illustrated in FIG. 7 may represent the operation of any of the BMS systems described in FIGS. 1-6. For example, the BMS described in FIG. 7 may represent the operation of: BMS 112 in FIGS. 1A-E, BMS 214 in FIGS. 1A-E, BMS 234 in FIG. 2, BMS 302 in FIG. 3, BMS 402 in FIG. 4, BMS 502 in FIG. 5, and/or BMS 600 in FIG. 6.

At 702, the BMS receives sensor signals from environmental sensors located in the data center associated with the BMS. Environmental sensors may include smoke detectors, particulate sensors, temperature sensors, air conditioning temperature and pressure sensors, power system sensors, and any other type of sensor associated with the data center.

At 704, the BMS identifies the data center event based on the type of sensor signal received. For example, a sensor signal from a smoke sensor may indicate a data center event of a fire. A signal from a power system sensor may indicate a data center event of a loss of a redundant power system. The BMS may receive multiple sensor signals and determine a data center event type based on the combination of sensor signals. For example, a smoke sensor signal without any other sensor signals may indicate a data center event type of a localized fire. Multiple smoke sensor signals along with temperature signals may indicate a data center event type of a large fire. The BMS may assign different event priority levels to different types of data center events.

At 706, the BMS identifies affected computer systems based on the sensor signal received. Each sensor is associated with a particular zone that is covered by that sensor. In addition, a directory stores information that identifies the location of each computer system and the zones that cover that location. The BMS may determine the affected computer systems by consulting the directory to see which computer systems are located in the zone affected by the sensor signal.

At 708, the BMS activates mitigation systems. In some embodiments, the path from the sensor signal to the mitigation systems may be electro-mechanical so that no logic is required. A positive reading from a sensor may energize a circuit to a device that mechanically implements mitigation. For example, a smoke sensor may induce a voltage over a hard wired circuit to a solenoid coupled to a valve. The smoke sensor indicating smoke may energize the solenoid and cause the valve to release fire water without any intervening logic. In other embodiments, a processor coupled to memory may read the sensor signal and determine the proper mitigation based on logic stored in memory.

At 710, the BMS generates notifications to console systems. In some embodiments the BMS sends a broadcast message to all console systems that a particular computer system is affected by the data center event and the console systems determine if a service they are administrating is implemented on the affected computer system. In other embodiments, the BMS determines the services implemented on the affected computer system or computer systems and selectively generates a notification for the services implemented on affected computer systems.

Figure 8:
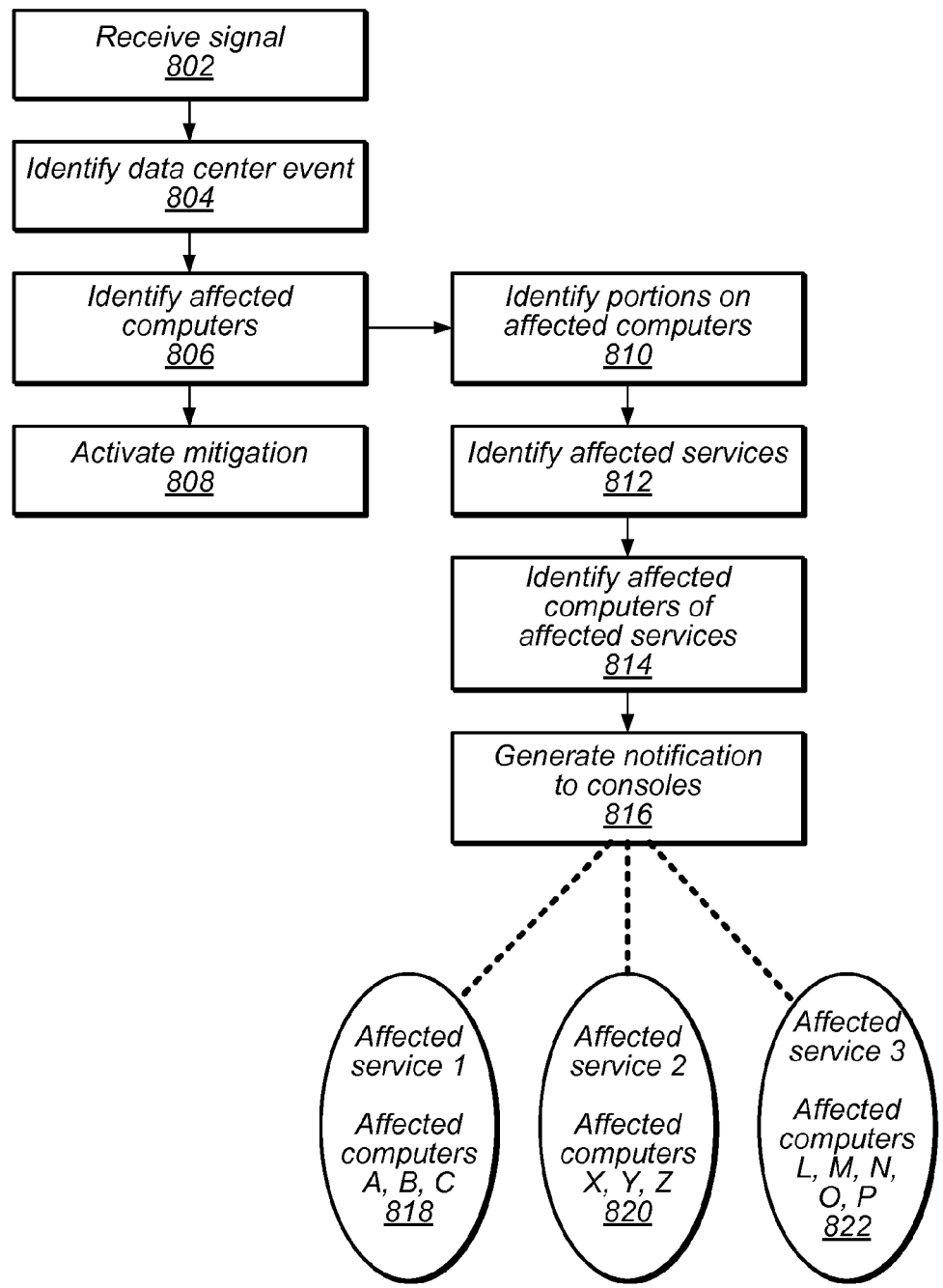
FIG. 8 illustrates a BMS responding to a data center event, according to some embodiments.

FIG. 8 illustrates operation of a building management system (BMS) in response to receiving a sensor signal from environmental sensors mounted in a data center according to some embodiments. The BMS illustrated in FIG. 8 includes the functionality of the BMS illustrated in FIG. 7 and includes additional functionality to identify affected network-based services and identify affected computer systems for the identified affected network-based services. The BMS illustrated in FIG. 8 may illustrate the operation of any of the BMS systems described in FIGS. 1-6.

At 802, the BMS receives sensor signals from environmental sensors located in a data center associated with the BMS.

At 804, the BMS identifies a data center event based on the type of sensor signal received. The BMS may receive multiple sensor signals and determine a data center event type based on the combination of sensor signals. The BMS may assign different event priority levels to different types of data center events.

At 806, the BMS identifies affected computer systems based on the sensor signal received. Each sensor is associated with a particular zone that is covered by that sensor. In addition, a directory stores information that identifies the location of each computer system and the zones that cover that location. The BMS may determine the affected computer systems by consulting the directory to determine which computer systems are located in the zone affected by the sensor signal.

At 808, the BMS activates mitigation systems. In some embodiments, the path from the sensor signal to the mitigation systems may be electro-mechanical so that no logic is required. In other embodiments, a processor coupled to memory may read the sensor signal and determine the proper mitigation based on logic stored in the memory.

At 810, the BMS identifies one or more service portions implemented on the affected computer systems identified at 808. In some embodiments, the BMS consults a directory that includes service implementation computer system information. The BMS determined affected computer systems at 810 and can query the directory to determine which service portions are running on the affected computer systems.

At 812, the BMS identifies services affected by the data center event. The BMS uses the affected service portions identified at 810 and the service implementation computer system information in the directory to determine which services are implementing the affected service portions. The determination results in identifying services affected by the data center event.

At 814, the BMS identifies the affected computer systems implementing a service portion of each affected service. Since a service may be implemented on many computer systems spread out across multiple data centers, there is a possibility that a single service may be implemented on more than one affected computer system. To identify the affected computer systems implementing a service portion of each affected service, the BMS uses the set of affected computer systems determined at 806 and the set of affected services determined at 812 to organize the two sets into a list of affected computer systems implementing a service portion of each affected service.

At 816, the BMS generates notifications to the console systems associated with the affected services. The notification indicates the affected service and all the affected computer systems that are implementing a service portion of that service. In some embodiments, the BMS selectively notifies affected services and may not send a notification to services associated with the data center that are not implemented on an affected computer system. For example the BMS may generate notifications 818, 820, and 822 to console systems of affected service 1, affected service 2, and affected service 3. Notification 818 may identify affected service 1 and that affected service 1 is implemented on affected computer systems A, B, and C. Notification 820 may identify affected service 2 and that affected service 2 is implemented on affected computer systems X, Y, and Z. Notification 822 may identify affected service 3 and that affected service 3 is implemented on affected computer systems L, M, N, O, and P. In some embodiments the BMS may include a command to replicate the service portions implemented on the affected computer systems in the notification. In some embodiments, the console systems may determine whether or not to replicate the service portions implemented on the affected computer systems based at least in part of the notification received from the BMS.

Figure 9:
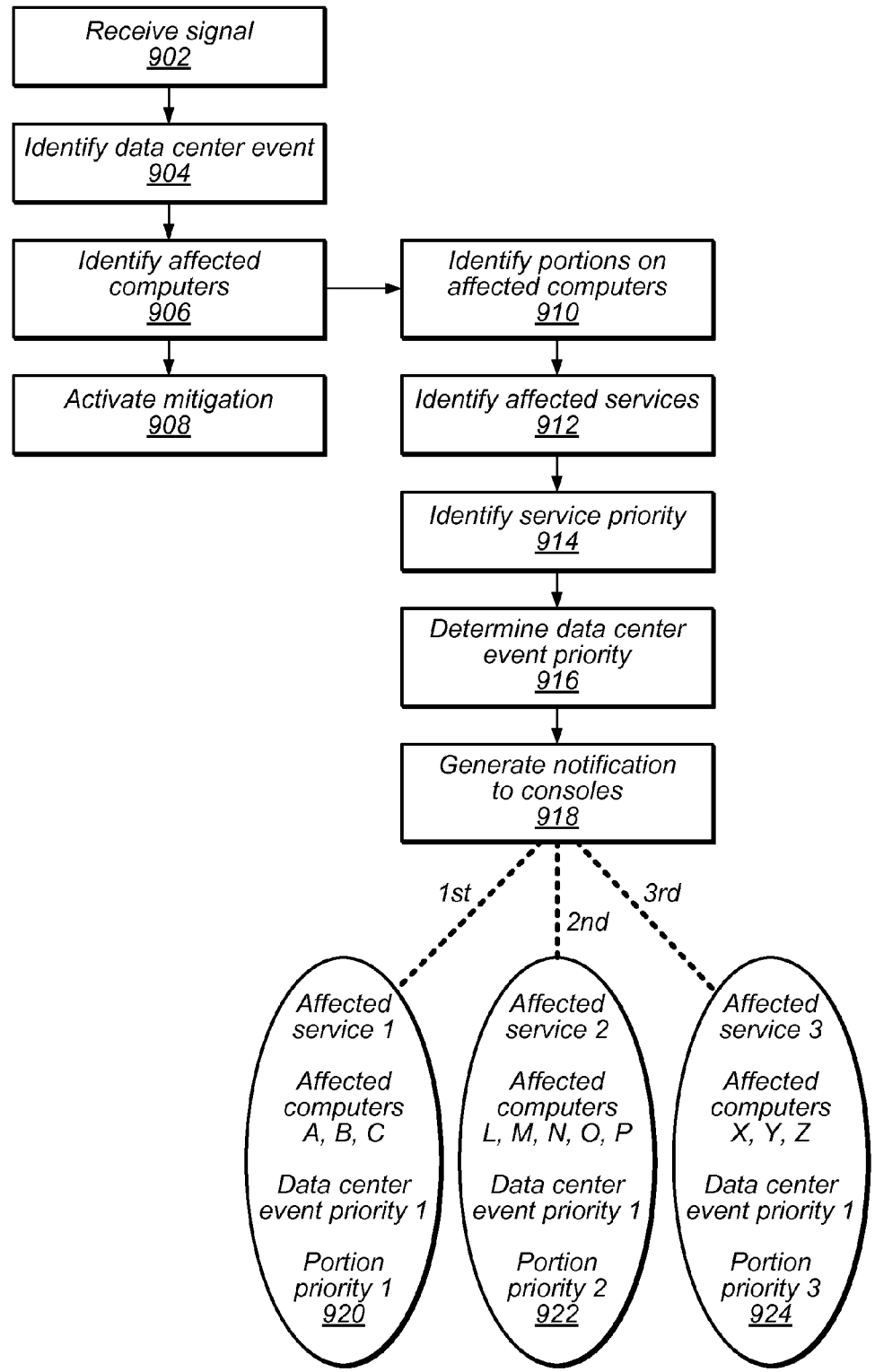
FIG. 9 illustrates a BMS responding to a data center event, according to some embodiments.

FIG. 9 illustrates operation of a building management system (BMS) in response to receiving a sensor signal from environmental sensors mounted in a data center according to some embodiments. The BMS illustrated in FIG. 9 includes all the functionality of the BMS illustrated in FIG. 8 and includes additional functionality to identify a data center event priority and a service portion priority and determine an order for generating notifications based on the data center event priority and the service portion priority. The BMS functions similarly to the BMS described in FIGS. 7 and 8 at 902, 904, and 906 where it receives a signal, identifies a data center event, identifies affected computer systems, and activates mitigation. The BMS functions similar to the BMS described in FIG. 8 at 910 and 912, where it identifies service portions on affected computer systems and identifies affect network-based services.

At 914, the BMS identifies a service priority. As discussed above in regards to FIG. 6, the BMS includes a directory comprising service priority information. After identifying the affected services at 912, the BMS consults the directory to determine the service priority of each affected service.

In some embodiments the BMS may not generate notifications to console systems that have a service portion priority below a threshold even though the service portion is implemented on affected computer systems. For example, a service portion that stores financial information including billing information may be considered a high priority service portion. A service portion that generates e-mail solicitations and is redundantly implemented may be a low priority service portion. In the event of a data center event affecting a computer system implementing both service portions, the BMS may determine the service portion that generates e-mail solicitations does not meet a threshold service portion priority. In response the BMS may not command replication of the service portion that generates e-mail solicitations. In some embodiments, an administrator may assign the service portion priority. In some embodiments, certain types of services may assign default service portion priorities that users can then adjust. In some embodiments, other methods may be used to assign service portion priorities.

In some embodiments, the service portion priority may be based at least in part on whether the service is redundantly implemented. In some embodiments, the BMS may selectively notify affected services that are implemented on affected computer systems if the service portions implemented on the affected computer systems are not redundantly implemented. In some embodiments the BMS may further determine a priority of each service portion implemented on an affected computer system based on the service portion priority and command the affected computer system to replicate the affected service portions in a prioritized order based on the service portion priority.

At 916, the BMS determines a data center event priority. Each sensor signal received at 902 may be associated with a particular sensor type and location. For example a particular sensor signal may be a power sensor. The power sensor may indicate the loss of a redundant power feed and may cover a whole data center or just a portion of the data center that receives power from the power feed coupled to the sensor. Another example is a temperature sensor. A temperature sensor may indicate a loss of cooling or a malfunction in a computer system amongst other things. A temperature sensor may be local to a specific rack or computer system. A temperature sensor may also represent a cooling system that covers a considerable portion of a data center. In each case, the sensor signal has both a type (power, temperature, etc.) and location (whole data center, particular rack, section of a data center, etc.) associated with it.

In some embodiments, the BMS may be programed such that different priorities can be assigned to different types of sensor signals and locations. For example, a sensor type that indicates a fire may receive a higher priority than a sensor type that indicates a loss of redundant power. Also, a sensor that covers a small number of computer systems, like a local temperature sensor may receive a lower priority than a sensor that covers a large number of computer systems like a smoke sensor in a large computer room. In some embodiments, the BMS may be further programed to assign different event priority levels for different combinations of sensor signals in different locations. For example, a smoke sensor along with a large portion of the temperature sensors in a room of a data center all sending sensor signals to the BMS during the same time frame may receive a high event priority level. While, multiple temperature sensors all spread out in different zones without any smoke sensors or carbon monoxide sensors may receive a low event priority level. In some embodiments, the BMS may determine that certain combinations of event signals are required before an event signal is generated. For example if a small number of un-related temperature sensors all send sensor signals at the same time, the BMS may determine that the sensors are isolated problems and not generate an event signal.

In some embodiments, the BMS may command a replication rate based on the event priority. As described above, a very high event priority may indicate that there is a spreading fire. In response, the BMS may command a replication of instances of state information at a rapid rate to attempt to save as much information as possible before the computer system storing the state information is lost to the fire.

In some embodiments, the BMS may determine the destination computer system to receive the replicated state information based on a physical proximity between the destination computer system and the affected computer system. For example, the BMS may determine that a data center event is likely to impact the whole data center and select a destination computer system in another data center at a different location. In other cases, the BMS may determine that the data center event is local to a specific computer system, such as a server failure and may select a destination computer system located in the same data center.

At 918, the BMS generates notifications to send to console systems administrating services that are implemented on affected computer systems. As discussed above, the BMS may send notifications in a prioritized order based on service portion priority. Notifications 920-924 may be sent out in order based on service portion priority. Affected service 1 is implemented on affected computer systems A, B, and C and at least some of the service portions of affected service 1 have a high service priority (service priority 1). Therefore a notification may be first sent to affected service 1, indicating that computer systems A, B, and C that are implementing affected service 1 are affected computer systems. In addition, the event signal may indicate that the data center event has a high priority (data center event priority 1). In a similar fashion, affected service 2 may be sent an event signal second because it has a service portion priority lower than affected service 1, likewise affected service 3 may be notified third because it has a lower service portion priority than both affected service 1 and affected service 2.

Figure 10:
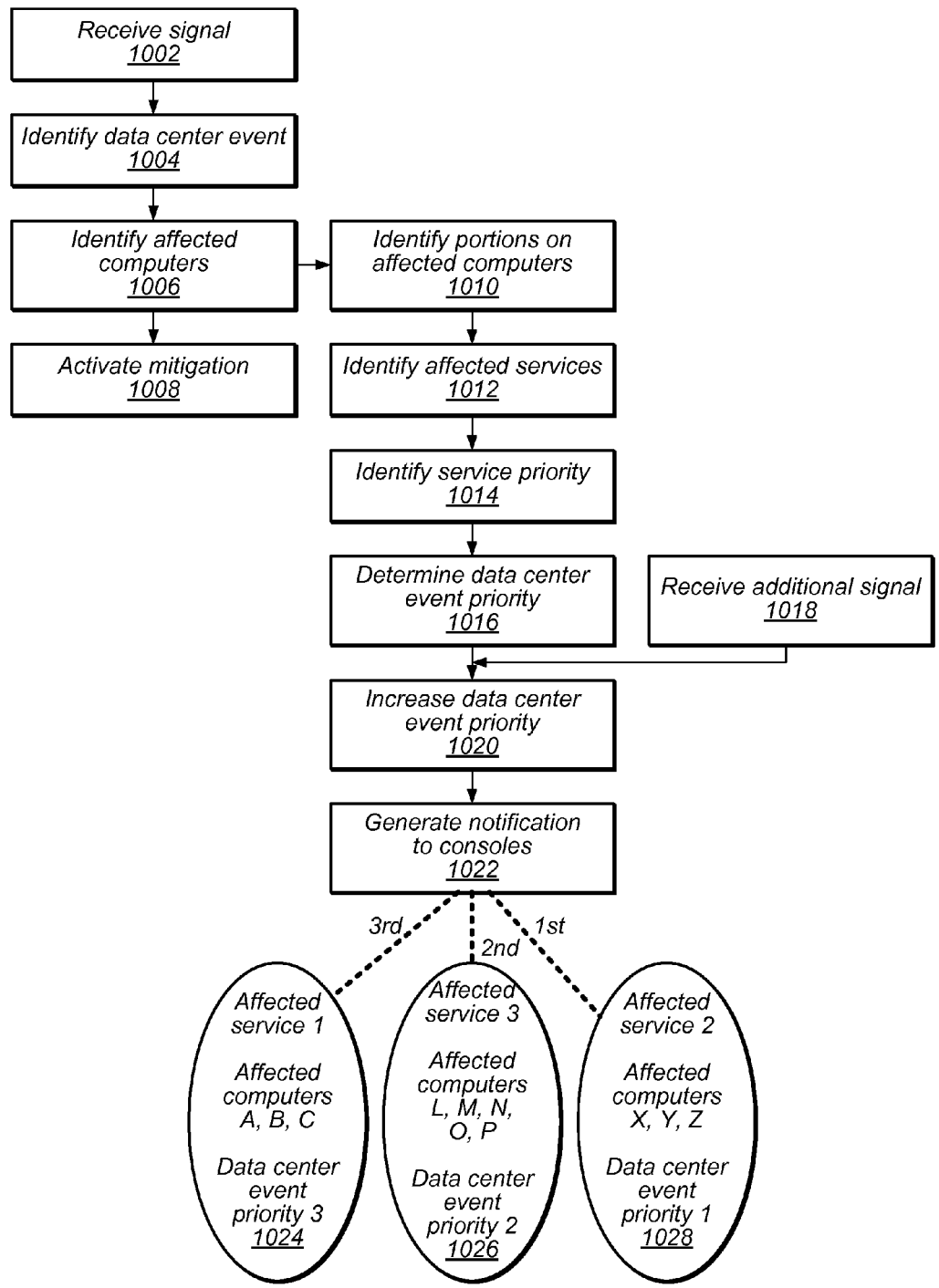
FIG. 10 illustrates a BMS responding to a data center event, according to some embodiments.

FIG. 10 illustrates operation of a building management system (BMS) in response to receiving a sensor signal from environmental sensors mounted in a data center according to some embodiments. The BMS illustrated in FIG. 10 includes all the functionality of the BMS illustrated in FIG. 9 and includes additional functionality to receive additional sensor signals and increase the data center event priority based on receiving additional sensor signals. The BMS described in FIG. 10 operates similar to the BMS described in FIG. 9 at 1002, 1004, 1006, 1008, 1010, 1012, 1014, and 1016. These are the steps where the BMS in FIG. 10 receives a sensor signal, identifies a data center event, identifies affected computer systems and activates mitigation. And the steps where the BMS identifies service portions on affected computer system, identifies affected network-based services, identifies a service portion priority, and determines a data center event priority.

At 1018, the BMS receives an additional sensor signal. The additional sensor signal may indicate that a data center event is spreading. For example the first sensor signal may have been a smoke detector in a particular zone. The subsequent sensor signal may be a smoke detector in an adjacent zone.

At 1020, the BMS may increase the data center event priority level based at least in part on receiving the additional sensor signal.

At 1022, the BMS generates notifications to console systems administrating services that are implemented on affected computer systems. In some embodiments, the BMS may generate an additional event signal subsequent to a previous event signal based at least in part on receiving additional sensor signals. In some embodiments the BMS may send the notifications to the console systems in a prioritized order based on the data center event priority. Different zones in a data center all managed by the same BMS may include sensors that all generate sensor signals within the same time frame. For example, a fire in one zone of a data center may cause smoke sensors in other zones in the data center to send a signal to the BMS. The BMS may determine that additional sensor signals received in one particular zone indicate the particular zone should be assigned a higher data center event priority relative to other zones. In the example of a fire, additional sensors like temperature and carbon monoxide sensors may indicate that the fire is in a particular zone and the other zones are just affected by the smoke from the fire in the particular zone.

At 1022, notifications are sent to console systems of affected services in a prioritized order based on data center event priority. Affected service 2 is notified first because it has the highest data center event priority, affected service 3 is notified second and affected service 1 is notified third. In the fire example, this may allow affected computer systems in the zone that includes the fire to use a larger portion of a data center's network resources to replicate state information from computer systems in the zone with the fire.

Figure 11:
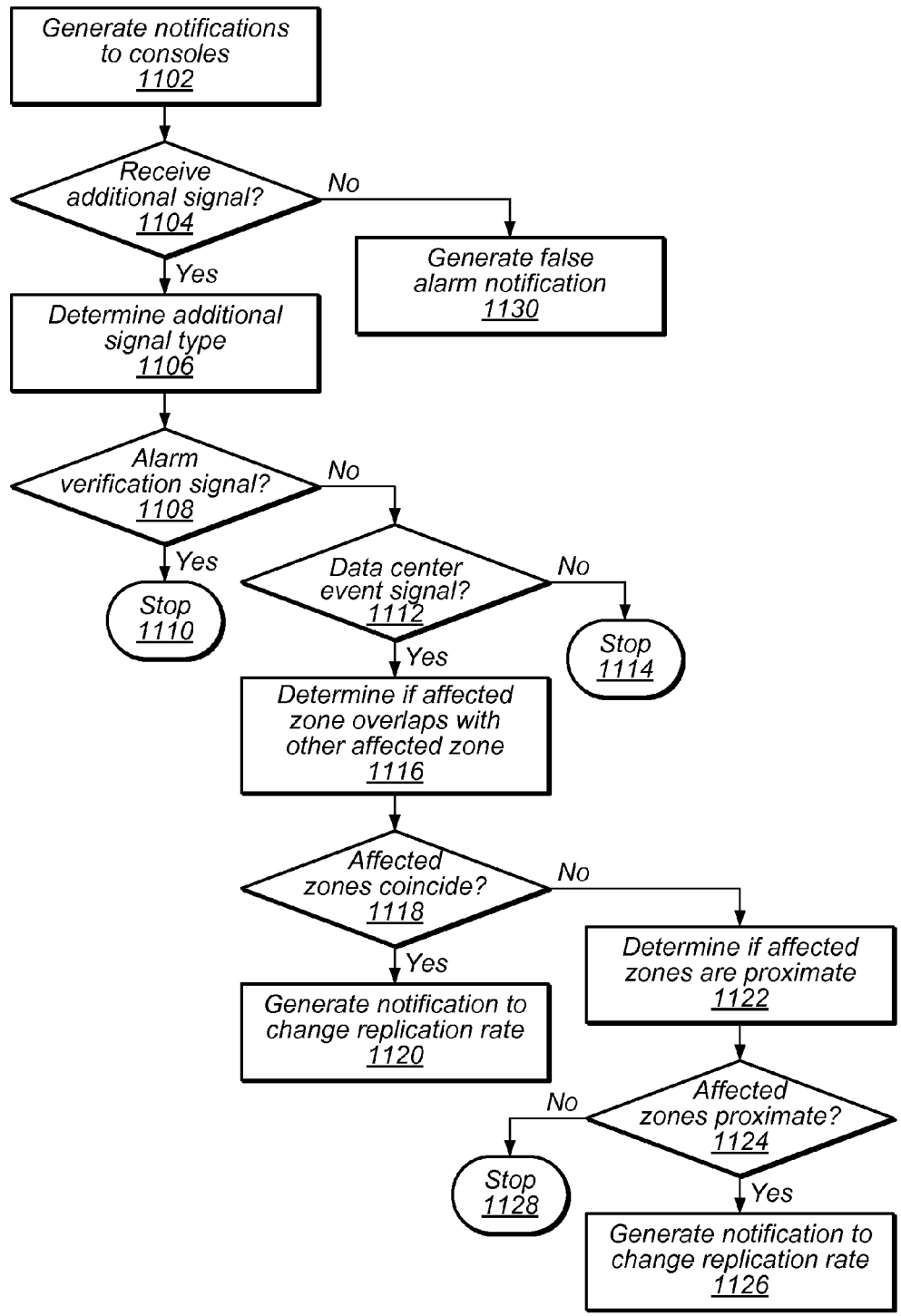
FIG. 11 illustrates a BMS responding to a data center event, according to some embodiments.

FIG. 11 illustrates a sequence of decisions made by a building management system (BMS) in response to receiving an additional sensor signal after sending an event signal to console systems according to some embodiments. The BMS system operation illustrated by FIG. 11 may operate on any of the BMS systems described in regards to FIGS. 1-6. Also, the BMS operations described in regards to FIGS. 7-10 may be combined with the operation described in FIG. 11.

At 1102 the BMS sends notifications to console systems administrating services implemented on affected computer systems based on decision made in FIGS. 7-10.

At 1104, the BMS determines if it has received additional sensor signals subsequent to an initial sensor signal. As described above, the BMS looks for a "first knock" and "second knock" to determine that a sensor signal from an environmental sensor represents a true data center event. For example, if the BMS receives a temperature signal indicating a high temperature then after a short time the temperature is back to normal, the MBS may determine that the original signal was a false alarm due to the lack of the "second knock."

At 1130, the BMS may generate a false alarm notification to send to console systems indicating that a previous event signal was a false alarm. In some embodiments the false alarm notification may include a command to delete state information that was replicated in response to the initial alarm that was a false alarm. In some embodiments, the console systems may determine if replicated state information should be deleted in response to a false alarm notification. In some embodiments, the BMS may wait to receive the "second knock" before issuing an event signal. In other embodiments the decision to wait for a second knock may be based at least in part on the service portion priority and the data center event priority.

At 1106 the BMS determines the type for the additional signal received. At 1108 the BMS decides if the additional signal is an alarm verification signal. The BMS may determine an alarm verification signal ("second knock') based on the subsequent signal coming from the same sensor type in the same location as the initial signal. At 1110, the BMS takes no further action in response to receiving an alarm verification signal. The BMS has already notified the affected services at 1102.

If the sensor signal is not an alarm verification signal, the BMS determines if the subsequent signal is a sensor signal that indicates an additional data center event, at 1112. If the signal is not an alarm verification signal and not a sensor signal associated with a data center event, the BMS takes no further action, at 114.

If the sensor signal indicates a subsequent data center event, the BMS determines if the zone associated with the second sensor signal coincides or overlaps with the zone associated with the first sensor signal. In some embodiments, if the zones overlap, the BMS may generate a subsequent notification with a command to increase the replication rate of state information from an affected computer system in the overlapping affected zones. In some embodiments, the BMS may determine if the affected zone associated with the subsequent event signal is proximate to the zone associated with the first event signal. Proximate zones may indicate that the data center event is spreading from one zone to a proximate zone. At 1126, if the BMS determines that the zone associated with the subsequent event signal is proximate to a zone associated with a prior event signal the BMS may send a notification with a command to console systems administrating services implemented on affected computer systems in the prior affected zone to increase a replication rate. The BMS may also determine a higher data center event priority for the initial notification to the console systems administrating services implemented on affected computer systems in the zone associated with the subsequent event signal.

Figure 12:
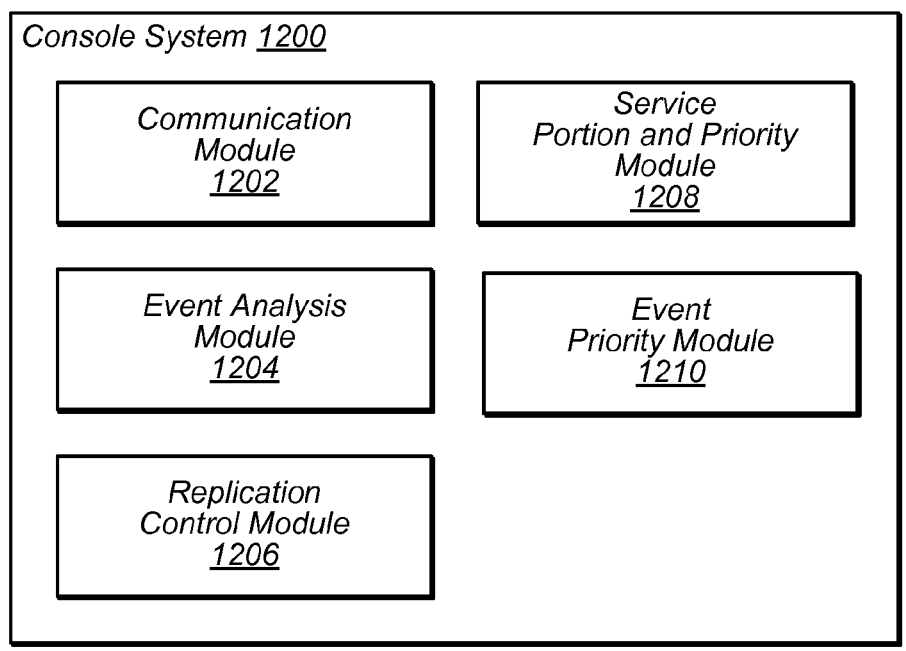
FIG. 12 illustrates a console system, according to some embodiments.

FIG. 12 illustrates console system 1200 comprising communication module 1202, event analysis module 1204, replication control module 1206, and service portion and priority module 1208 according to some embodiments. Console system 1200 administrates a service including service portions implemented on one or more computer systems.

Console system 1200 may represent any of the console systems described in FIGS. 1-5. For example, console system 1200 may represent: console systems 102 and 104 in FIGS. 1A-E; console systems 222, 224, and 226 in FIG. 2; console system 304 in FIG. 3; console system 406 in FIG. 4; and/or console system 540 in FIG. 5.

Communication module 1202 may receive event signals from one or more building management systems (BMS) that are managing a data center including at least one computer system that is implementing at least a portion of a service administrated by console system 1200. The communication may include a list of all computer systems located in a zone affected by a data center event regardless of whether those computer systems implement a portion of the service administrated by console system 1200. In some embodiments, the communication may indicate a list of all service portions implemented on affected computer systems. In some embodiments, the event signal might be directed to console system 1200 and selectively identify computer systems affected by the data center event that implement portions of the service administrated by console system 1200. In some embodiments, the event signal may also include an event priority level.

In some embodiments, the event signal may not include any commands for console system 1200 to initiate replication of state information. In these embodiments, console system may determine based on the received event signal whether or not to initiate replication of state information. As described below, console system 1200 may also determine priorities and rates for replication of state information based at least in part on the received event signal.

In some embodiments, the event signal may include a command from a BMS to replicate state information in a particular order based on service portion priority, at a particular rate based on event priority level, or both. In some embodiments console system 1200 may further determine the priority for replication of particular service portions and the rate at which to replicate particular service portions in response to receiving a command from a BMS to replicate state information.

Event analysis module 1204 may determine a replication rate and a replication destination based at least in part on the service portion priority and the event priority level. Event analysis module 1204 may receive information relating to the event signal received by communication module 1202. In some embodiments the information identifies affected computer systems regardless of whether they are implementing a service portion administrated by console system 1200. In some embodiments the information selectively identifies affected computer systems that are implementing a service portion administrated by console system 1200. In embodiments where the information identifies affected computer systems regardless of whether the affected computer systems are implementing a service portion administrated by service console 1200, event analysis module 1200 queries service portion and priority module 1208 to determine if one of the affected computer systems listed in the information received from communication module 1202 is a computer system implementing a service portion administrated by service console 1200. Service portion and priority database 1208 includes information that identifies each service portion implemented on a particular computer system and the priority of that service portion. By using the information received from communication module 1202 that identifies all affected computer systems, and the information from service portion and priority module 1208 that identifies each service portion implemented on each particular computer system, event analysis module 1204 can determine if one of the affected computer systems is a computer system implementing a service portion administrated by console system 1200.

In some embodiments, event analysis module 1204 may also determine a service portion priority for affected service portions. After identifying the affected service portions implemented on one or more of the affected computer systems, event analysis module can use the information in service and priority module 1208 to determine the priority associated with the affected service portion. In some embodiments, sets of state information comprising a service portion may have the same service portion priority, or individual sets of state information may have different priorities. In some embodiments, individual sets of state information comprising a service portion may have separate priorities. Service portion priority may be based on whether service portions or sets of state information within a service portion are redundantly implemented. For example, redundantly implemented service portions may receive a lower service portion priority than non-redundantly implemented service portions. In some embodiments, redundantly implemented service portions may receive a higher service priority than non-redundantly implemented service portions. For example, a redundantly implemented service portion may comprise important state information and the network-based service comprising the redundantly implemented service portion may be under an obligation to maintain a set number of replicas of the redundantly implemented service portion. A higher service portion may be assigned to ensure that the network-based service fulfills its obligation to maintain a set number of replicas of the redundantly implemented service portion. Service portion priority may be based on other factors in some embodiments. For example, sets of state information may be associated with different levels of importance, or associated with different users such that the priority may be based on a classification of user.

In some embodiments, event analysis module 1204 may determine a replication rate for state information included in a particular service portion implemented on an affected computer system. In response to determining that a service portion is a high priority service portion, event analysis module may command a rapid backup process. In addition, an event signal received by communication module 1202 may include an event priority level assigned by a BMS. In some embodiments, console system 1200 may assign its own event priority based on criteria stored in event priority module 1210. Event analysis module 1204 may also command a rapid backup process in response to determining that the data center event has a high event priority level. Event analysis module 1204 may also command a relaxed backup process in response to determining the affected service portion on the affected computer system is not a high priority service portion and the data center event affecting the affected computer system does not have a high event priority level. Event analysis module 1204 may change the replication rate assigned to the replication of a particular service portion of a service based on receiving a subsequent event signal that indicates that the data center event affecting the affected computer system implementing the affected service portion has changed to have a high event priority level.

In some embodiments, a rapid backup process may entail halting other operations on a computer system executing the backup in order to give priority to the rapid backup. A rapid backup process may also entail a network allocating additional bandwidth for the rapid backup process. The computer system executing the rapid backup process may alternately prioritize the rapid backup process ahead of other operations without halting other operations on the computer system. In some embodiments, other methods may be used to implement a rapid backup process.

In some embodiments, a relaxed backup process may entail coordinating the relaxed backup process with other operations on the computer system executing the relaxed backup process and with network demand so that the relaxed backup process is selectively conducted during periods of low demand on the computer system and low traffic levels on the network.

In some embodiments, event analysis module 1204 may command deletion of replicated state information in response to receiving a false alarm event signal from the BMS.

In some embodiments, event analysis module 1204 may communicate with a BMS associated with one or more computers implementing a service portion of the network-based service administrated by the console computer system containing event and analysis module 1204 and request a delayed initiation of one or more BMS control functions. For example, console event and analysis module 1204 may receive an event signal from a BMS indicating that a computer system implementing a service portion associated with the console computer system containing event analysis module 1204 is experiencing a data center event involving a malfunction of the cooling air system. Event analysis module 1204 may determine that a high priority service portion is implemented on one of the computer systems affected by the cooling air system malfunction and request the BMS to delay initiating a BMS control function such as shutting down all racks in the zone associated with the cooling air system malfunction. In some embodiments event and analysis module 1204 may send feedback messages to a BMS system to request other modifications to BMS control functions in response to determining a high priority service is implemented on a computer system affected by a data center event. A BMS may determine to act on the request received from an event and analysis module 1204 or may determine to initiate a BMS control function despite a request from a console computer system.

Replication control module 1206 may determine the destination of replicated state information. Replicated state information may be replicated to a remote computer system at a different physical location or to a local computer system in the same data center. In some embodiments, replication control module may determine the destination of replicated state information based at least in part on the event priority level. A high event priority may cause replication control module 1206 to select a destination that is in a different location than the data center with the data center event with a high event priority level. Replication control module 1206 may determine to locally replicate state information to a location within the same data center as the affected computer system in response to determining that the data center event priority level is not a high event priority level. For example, a high event priority level may correspond with a data center event such as a large fire. In instances like this, the replication control module may replicate the state information stored in an affected computer system in the data center with a fire to a completely different data center to avoid any replication destination being consumed in the fire along with the original location of the state information. However, a data center event without a high event priority level such as a loss of an air conditioning system in one zone of a data center, may cause event control module 1206 to replicate state information stored on an affected computer system to another computer system in the same data center that is not affected by the air conditioning failure.

FIG. 13 illustrates service portion and priority information 1300 stored in a service portion and priority module included in a particular console system administrating a particular service according to some embodiments. Service portion and priority information 1300 may be stored in service portion and priority module 1208 illustrated in FIG. 12. Each computer system implementing a service portion administrated by the console system is listed in the column Computer system ID. Each service portion implemented on each particular computer system is listed in the column Portion Implemented. A service portion priority is listed for each portion implemented by the particular service in the column Portion Priority. In some embodiments, an administrator may assign portion priorities. Also, a particular network-based service or type of network-based service may have a default service portion priority that users of the network-based service can adjust. A service portion priority may be based on whether the service portion is redundantly implemented. In some embodiments, other methods may be used to determine service portion priorities. In some embodiments more than one service portion of a particular service may be implemented on the same computer system. In some embodiments a console system may determine an order of replication for multiple service portions affected by one or more data center event at the same time based on service portion priority information for the affected service portion.

In some embodiments, separate priorities may be assigned to individual sets of state information or groups of state information that comprise a service portion. In these embodiments, separate sets of state information comprising a service portion may be treated differently based on their respective priorities. For example, a replication process that replicates service portions in a prioritized order, may replicate high priority sets of state information within a particular service portion before other lower priority sets of state information within the same service portion.

The particular console system storing service portion and priority information 1300 hereinafter referred to as information 1300, may use information 1300 to determine in response to receiving an event signal from a BMS if the particular console system is implemented on an affected computer system. The event signal from a BMS may identify a list of affected computer systems. The particular console system may cross reference the computer systems identified in the event signal against Computer System ID in information 1300 to determine if one or more of the affected computer systems is a computer system implementing a service portion administrated by the particular console system. In addition, the particular console system may determine the service portions implement on affected computer systems and a priority for each service portion implemented on an affected computer system.

For example, an event signal might indicate that computer systems 1-3, 2-1, and 2-2 are affected computer systems. The first digit in computer system 1-3 indicates the computer system is located in data center 1. The second digit indicates that the computer system is the third computer system in data center one implementing a service portion of the network-based service administrated by the console system comprising information 1300. A similar system is used to identify computer systems 2-1 and 2-2. The particular console system storing information 1300 may use information in the Computer System ID column to determine that the service administrated by the particular console system comprising information 1300 is implemented on at least one of affected computer systems 1-3, 2-1, and 2-2. The particular console system may also use the Portion Implemented column of information 1300 to determine which service portions of the service administrated by the particular console system are implemented on affected computer systems 1-3, 2-1, and 2-2. For example, the particular console system may determine that service portions 6, 3, and 5 are implemented on computer systems 1-3, 2-1, and 2-2 respectively. In addition the particular console system may determine that portion 6 has the highest priority, portion 5 has the next highest priority, and portion 3 has the lowest priority of the three affected portions based on the Portion Priority column of information 1300. The particular console system may further command replication of service portions in an order based on service portion priority. For example, the particular console system may replicate portion 6 first, portion 5 second, and portion 3 third based on the respective service portion priorities of portions 3, 5, and 6.

As can be seen in FIG. 13, in some embodiments a particular computer system may implement more than one service portion for the same network-based service. For example, computer system 2-3 implements portions 7, 2, and 8 that are all part of the same network service administrated by the console system comprising service and portion priority information 1300.

Figure 14:
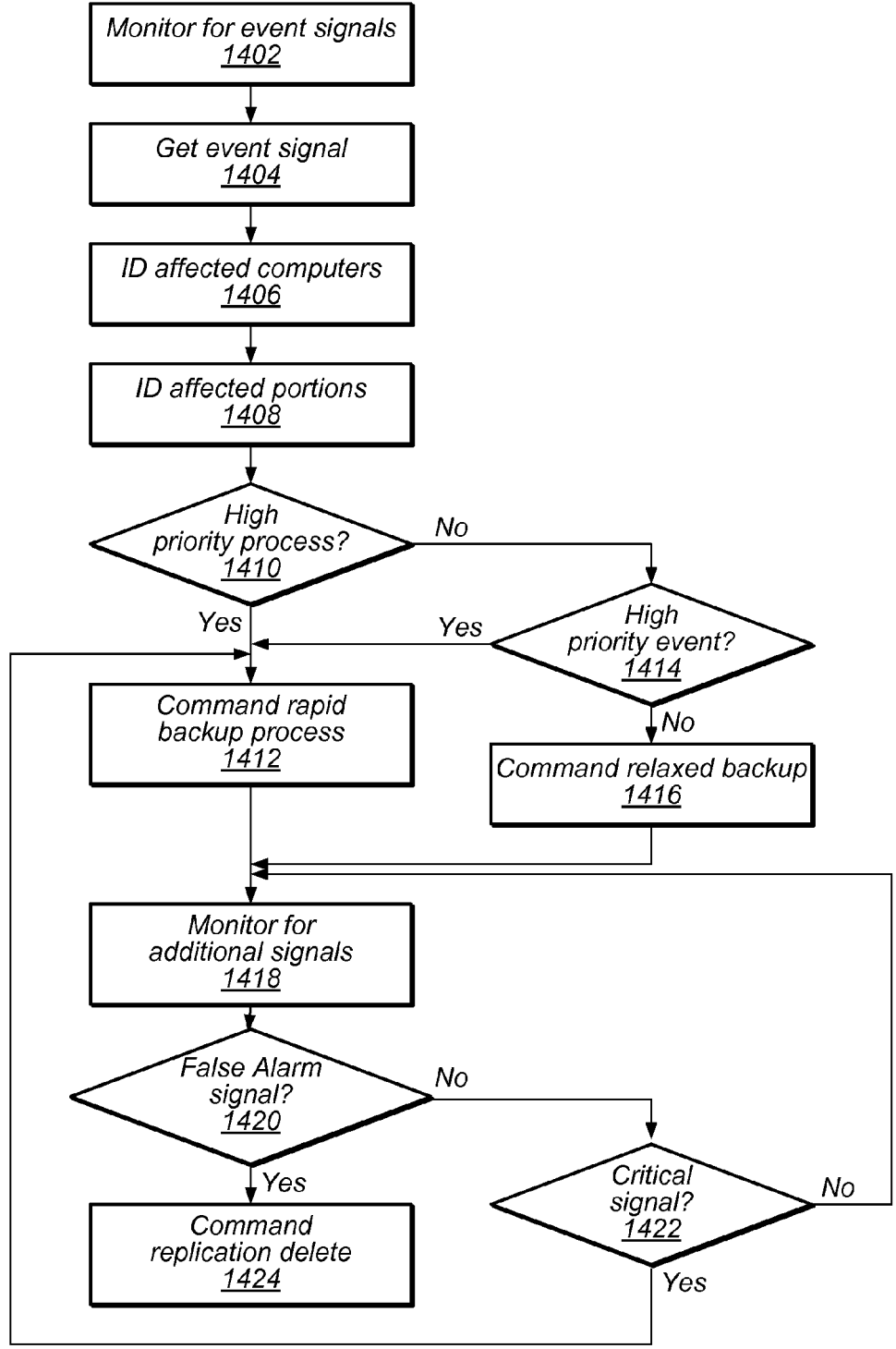
FIG. 14 illustrates a console system managing replication of state information, according to some embodiments.

FIG. 14 illustrates decisions made by a console system in response to receiving an event signal from a building management system (BMS) according to some embodiments. The console system decisions illustrated by FIG. 14 may operate on any of the console systems described in regards to FIGS. 1-5 and FIG. 12.

At 1402, the console system monitors for event signals from one or more BMS's that are associated with a data center including a computer system implementing a service portion of the service administrated by the console system.

At 1404, the console system receives an event signal from a BMS identifying one or more computer systems affected by a data center event and an event priority for the data center event. At 1406, the console system determines if any of the affected computer systems listed in the event signal are implementing a portion of the service administrated by the console system by consulting a service portion and priority module. At 1408, the console system identifies a service portion implemented on an affected computer system and determines the priority of the affected service portion based on information stored in a service portion and priority module.

At 1410, the console system determines if the service portion is a high priority service portion. In some embodiments, the priority of the service portion may depend at least in part on whether the service portion is implemented redundantly in more than one location. In some embodiments, the service portion priority may depend on the type of service the service portion is a part of it. For example, a financial transaction service may have a high priority compared to services like e-mail solicitations. As described in regards to FIG. 12, redundantly implemented service portions may receive a higher or lower service portion priority depending on the particular state information making up the service portion, network conditions, and any agreements that may require a certain number of replicas be maintained.

At 1412 in response to determining the service portion is a high priority service portion, the console system may command a rapid backup process. A rapid backup process comprises prioritizing replication of state information over other priorities associated with the resources needed to replicate the state information. A relaxed backup process comprises selectively replicating state information in a way that conserves system resources. For example, a rapid replication may entail allocating additional bandwidth from a network for replication of state information and/or allocating additional processing time on the processor executing the rapid backup. A relaxed backup may entail selectively replicating state information when there is excess processing capacity or excess network capacity so that replication of state information does not interfere with other operations of the computer system and network executing the relaxed backup. Depending on network conditions and processor demand, in some situations, a relaxed backup may be completed in a shorter amount of time than a rapid backup for a similar quantity of state information.

At 1418, the console system monitors for additional signals from the BMS that sent the initial event signal. At 1420, the console system determines if a subsequent event signal from the BMS is a false alarm signal. The BMS looks for a "first knock" and "second knock" to determine if a sensor signal is a false alarm. If no "second knock" is received after a set amount of time, the BMS may issue a false alarm event signal. At 1424, the console system commands deletion of state information replicated between receipt of the first event signal and a subsequent event signal indicating a false alarm.

At 1414, the console system determines if the event signal is a high priority event signal after determining that the service portion priority is not a high service portion priority. If the event priority is a high priority event level, the console system may command a rapid backup process. If both the service portion priority and the event priority are not high priority, then the console system may command a relaxed backup process at 1416 and monitor for additional signals at 1418.

At 1422, in response to determining that the additional event signal from the BMS is not a false alarm signal, the console system determines if the additional signal is an event signal with a high event priority level. If the event signal has a high event priority level, the console system may command rapid backup process at 1412. If the additional sign is an event signal that does not have a high event priority level, the console system continues to monitor for additional signals at 1418.

Figure 15:
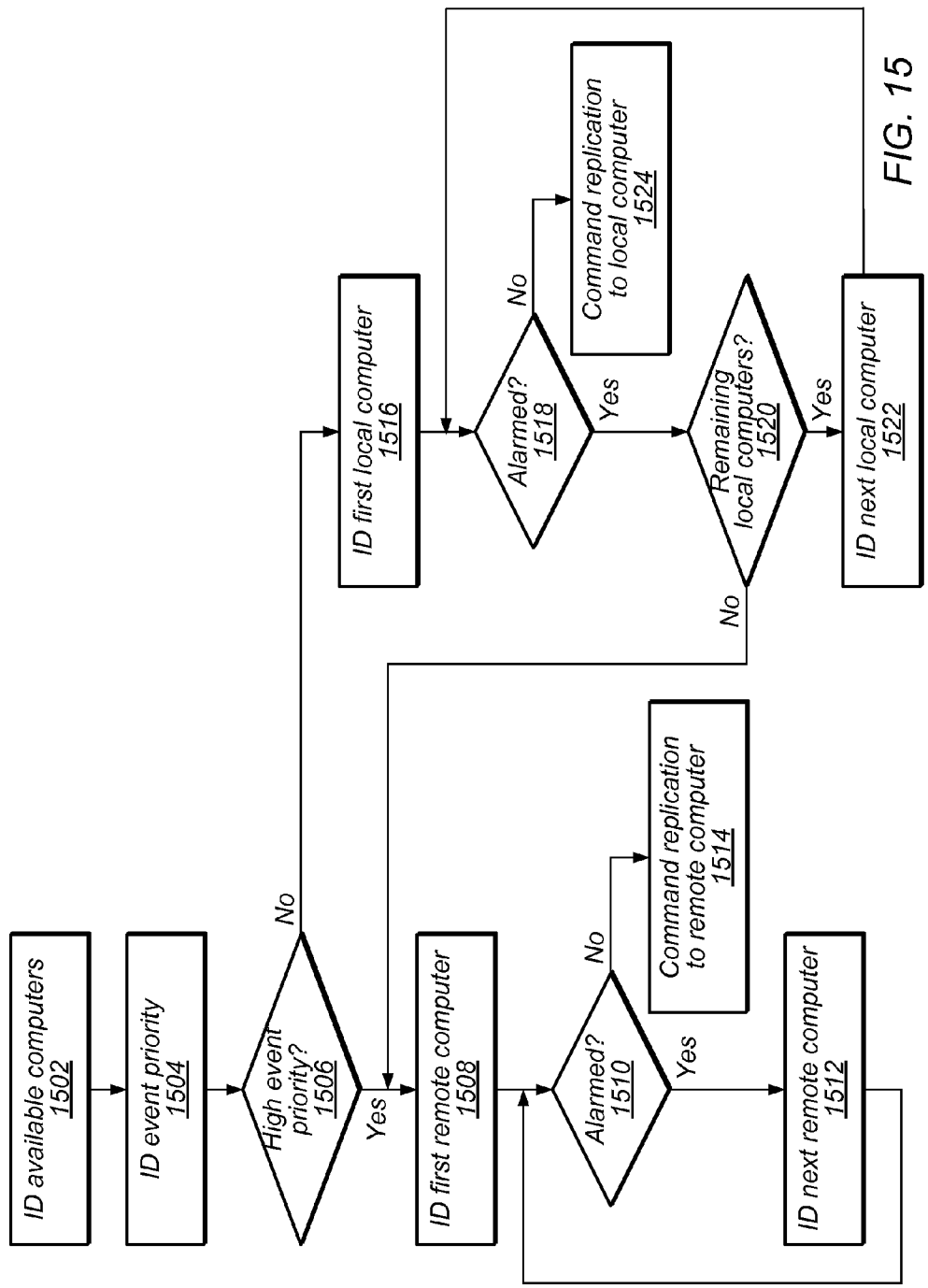
FIG. 15 illustrates a console system determining a location for replication of state information from an affected computer system, according to some embodiments.

FIG. 15 illustrates decisions made by a console system relating to selecting a location to replicate state information according to some embodiments. The console system decisions illustrated by FIG. 15 may operate on any of the console systems described in regards to FIGS. 1-5 and FIG. 12. Also, the decisions made by a console system described in regards to FIG. 14 may be combined with the operation of the console system illustrated in FIG. 15.

At 1502, the console system identifies available computer systems to receive replicated state information from affected computer systems.

At 1504, the console system identifies the event priority associated with the data center event affecting the affected computer systems.

At 1506, the console system determines if the data center event affecting the affected computer system has a high event priority level. If the event priority is high the console system searches for a remote location for data replication. At 1508, the console system identifies a first computer system at a remote data center.

At 1510, the console system determines whether the identified remote computer system is affected by the same data center event or another data center event. At 1512, the console systems identifies another remote computer system in response to determining the first identified computer system is an affected computer system. The console system may continue looking for a remote computer system until it finds a remote computer system that is not an affected computer system. At 1514, the console system commands replication of state information stored on the affected computer system to the identified remote computer system that is not an affected computer system.

At 1516, the console system identifies the first local computer system as a destination for replication of state information in response to determining that the event priority is not a high event priority level. At 1518, the console system determines if the identified local computer system is in an affected computer system. At 1514, the console system commands replication to the identified local computer system in response to determining the identified local computer system is not an affected computer system.

At 1520, the console system determines if there are any remaining local computer systems in response to determining that the previously identified local computer system is an affected computer system. In response to determining that there are remaining local computer system, the console system may identify a next local computer system at 1522 and loop back to 1518 to determine if the next local computer system is an affected computer system. In response to determining that there are not any remaining local computer systems, the console system identifies a remote computer system at 1508.

Figure 16:
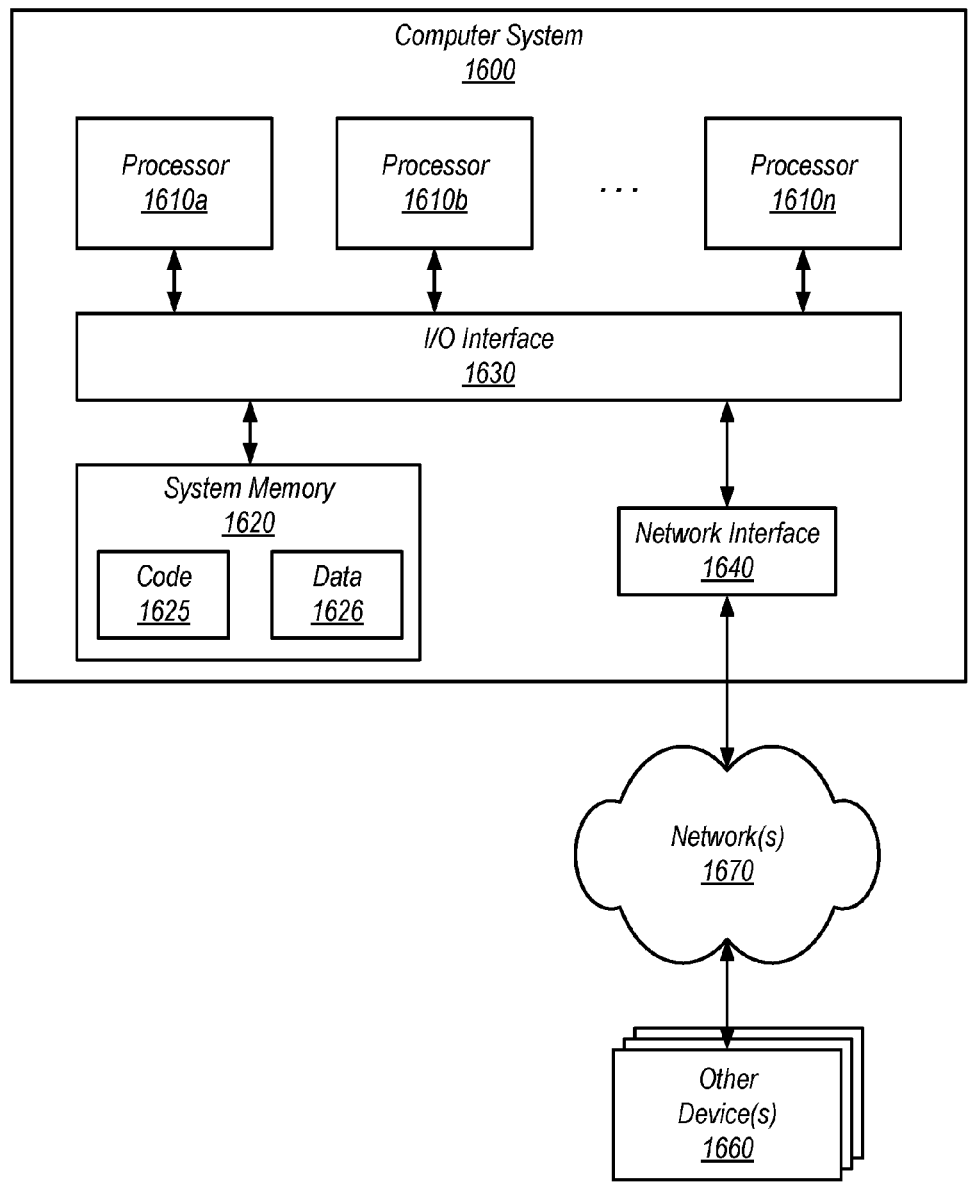
FIG. 16 illustrates a block diagram of an example computer system that may be used in some embodiments.

FIG. 16 is a block diagram illustrating an example computer system that may be used in some embodiments.

In some embodiments, a system that implements a portion or all of one or more of the technologies, including but not limited to a portion or all of the building management system, one or more modules included in the building management system, and various building management methods, systems, devices, and apparatuses as described herein, may include a general-purpose computer system that includes or is configured to access one or more computer system-accessible media, such as computer system 1600 illustrated in FIG. 16. In the illustrated embodiment, computer system 1600 includes one or more processors 1610 coupled to a system memory 1620 via an input/output (I/O) interface 1630. Computer system 1600 further includes a network interface 1640 coupled to I/O interface 1630.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

System memory 1620 may be configured to store instructions and data accessible by processor(s) 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of the power infrastructure, one or more modules included in the power monitoring system, and various power management methods, systems, devices, and apparatuses as described herein, are shown stored within system memory 1620 as code 1625 and data 1226.

In some embodiments, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1650, such as other computer systems or devices as illustrated in FIGS. 1 through 15, for example. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks such as Fibre Channel SANs, or via any other suitable type of network and/or protocol.

In some embodiments, system memory 1620 may be some embodiments of a computer system-accessible medium configured to store program instructions and data for implementing embodiments of power management methods as described above relative to FIGS. 1-15. In other embodiments, program instructions and/or data may be received, sent or stored upon different types of computer-accessible media. Generally speaking, a computer system-accessible medium may include non-transitory storage media or memory media such as magnetic or optical media, e.g., disk or DVD/CD coupled to computer system 1600 via I/O interface 1630. A non-transitory computer system-accessible storage medium may also include any volatile or non-volatile media such as RAM (e.g. SDRAM, DDR SDRAM, RDRAM, SRAM, etc.), ROM, etc., that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link such as may be implemented via network interface 1640.

Various embodiments may further include receiving, sending or storing instructions and/or data implemented in accordance with the foregoing description upon a computer-accessible medium. Generally speaking, a computer system-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
  a data center, comprising:

a plurality of sets of computer systems, wherein each set of computer systems of the plurality of sets of computer systems is located in a separate zone of a plurality of zones in the data center;

a plurality of environmental sensor devices, wherein at least a particular environmental sensor device of the plurality of environmental sensor devices is associated with a particular zone of the plurality of zones and is configured to generate a sensor signal indicating an occurrence of a particular data center event associated with the particular zone, based at least in part upon detection of the occurrence of the particular data center event; and a building management system (BMS) device communicatively coupled to each of the plurality of environmental sensor devices and configured to:
 receive the sensor signal from the particular environmental sensor device, the sensor signal indicating the occurrence of the particular data center event associated with the particular zone, and
 generate an event signal indicating the occurrence of the particular data center event associated with the particular zone, based at least in part upon identification of the particular zone as being associated with the occurrence of the particular data center event; and one or more console systems implemented on one or more computer systems, the one or more console systems configured to administer one or more service portions of a particular service, wherein each of the at least one or more service portions of the particular service comprises one or more instances of state information and is implemented by a particular computer system, the one or more console systems implemented on one or more computer systems configured to:
 command replication of the one or more instances of state information of the at least one service portion of the particular service from the particular computer system to a separate computer system, based at least in part upon receipt of the event signal from the BMS device via a communication network and identification of the particular computer system as being included in the particular zone associated with the occurrence of the particular data center event.

2. The system of claim 1, wherein:
the BMS device is configured to identify at least the at least one service portion of the particular service as being implemented by the particular computer system, based at least in part upon an identification of the particular computer system as being included in a particular set of computer systems located in the particular zone;
the event signal comprises a command to replicate at least the at least one service portion of the particular service to the separate computer system; and
one of the one or more console systems is implemented on the particular computer system, wherein the particular computer system is configured to command replication of the one or more instances of state information of the at least one service portion of the particular service to the separate computer system, based at least in part upon receipt of the event signal from the BMS device via the communication network.

3. The system of claim 1, wherein:
the BMS device is configured to identify at least one particular event priority level of a plurality of event priority levels associated with the data center event, based at least in part upon identification of the occurrence of the particular data center event associated with the particular zone;
the event signal indicates the at least one particular event priority level associated with the particular data center event;
to command replication of the one or more instances of state information of the at least one service portion of the particular service from the particular computer system to a separate computer system, based at least in part upon receipt of the event signal from the BMS device via a communication network, the one or more console systems implemented on one or more computer systems are configured to command the replication according to a particular replication mode of a plurality of replication modes, based at least in part upon the at least one particular event priority level associated with the particular data center event that is indicated in the event signal.

4. The system of claim 3, wherein:
the BMS device is configured to:
 subsequently to receiving the sensor signal from the particular environmental sensor device, receive a subsequent sensor signal from at least one of the plurality of environmental sensor devices, the subsequent sensor signal indicating an occurrence, subsequent to the occurrence of the particular data center event, of another data center event associated with the particular zone;
 identify another event priority level of the plurality of event priority levels associated with the subsequent data center event, based at least in part upon identification of the subsequent occurrence of the subsequent data center event associated with the particular zone; and
 generate a subsequent event signal indicating the subsequent occurrence of the subsequent data center event associated with the particular zone;
the one or more console computer systems are configured to:
 continue replication of the one or more instances of state information of the at least one service portion of the particular service from the particular computer system to the separate computer system according to a different replication mode of the plurality of replication modes that is distinct from the particular replication mode, based at least in part upon receipt of the subsequent event signal from the BMS device via the communication network during the replication and identification of the subsequent event priority level associated with the subsequent data center event that is indicated in the subsequent event signal.

5. An apparatus, comprising:
one or more computing devices to implement a building management system comprising:
 a processing module implemented via a processor and memory of at least one of the one or more computing devices and configured to:
  identify at least one particular zone of a plurality of zones in a data center that is associated with an occurrence of a data center event, based at least in part upon receipt of a sensor signal from a sensor device associated with the particular zone; and
 a notification module implemented via a processor and memory of at least one of the one or more computing devices and configured to:

generate an event signal for transmission, via a communication network, to at least one console system, implemented on one or more computer systems, that is administrating at least one service portion of a service comprising one or more instances of state information on at least one computer system in the data center, the event signal indicating that the at least one computer system is located in the at least one particular zone associated with the occurrence of the data center event, such that the at least one console system commands replication of the one or more instances of state information of the at least one service portion of the service from a particular computer system to a separate computer system based at least in part upon identification, at the at least one console system, of the at least one service portion of the service as being associated with the occurrence of the data center event.

6. The apparatus of claim 5, wherein:

the processing module is configured to identify the at least one service portion of one or more services as being associated with the occurrence of the data center event, based at least in part upon a determination that the at least one service portion is being implemented by one or more computer systems associated with the particular zone that is associated with the occurrence of the data center event; and the notification module is configured to generate the event signal for transmission to the at least one console system administrating the at least one service portion based at least in part upon the identification of the at least one service portion of the service as being implemented by the at least one console system.

7. The apparatus of claim 6, wherein:

the processing module is further configured to identify a particular service portion priority level associated with the at least one service portion, based at least in part upon the identification of the at least one service portion as being associated with the occurrence of the data center event; and the notification module is configured to generate the event signal for transmission to the at least one console system based at least in part upon a determination that the particular service portion priority level exceeds a particular predetermined priority threshold value.

8. The apparatus of claim 7, wherein:

the particular service portion priority level is associated with the at least one service portion of the service based at least in part upon a redundancy associated with the at least one service portion, wherein the particular service portion priority level is determined to exceed the particular predetermined priority threshold value based at least in part upon the at least one service portion being implemented exclusively by a particular computer system that is associated with the particular zone.

9. The apparatus of claim 5, wherein:

the notification module is further configured to subsequently generate a subsequent event signal for transmission, via the communication network, to the at least one console system, the subsequent event signal indicating that the occurrence of the data center event comprises a false occurrence of the data center event, such that the at least one console system commands deletion of a replicated set of state information of the at least one portion from the separate computer system based at least in part upon identification, at the at least one console system, of the false occurrence of the data center event.

10. The apparatus of claim 5, wherein:

the at least one service portion of the service comprises a plurality of portions of the service, wherein each of the plurality of portions is implemented by at least one computer system associated with the particular zone, wherein each of the plurality of portions of the particular service is assigned one of a plurality of priority levels;

to generate the event signal for transmission to the at least one console system implemented on one or more computer systems, the notification module is configured to generate an event signal identifying each of the plurality of portions implemented by the at least one computer system and specifying a particular order of replication based at least in part upon an order of the plurality of priority levels assigned to each of the plurality of portions, such that the at least one console system commands replication of the plurality of portions from the at least one computer system to the separate computer system in the particular order of replication.

11. The apparatus of claim 5, wherein:

the processing module is configured to select the separate computer system from a plurality of computer systems based at least in part upon a determined physical proximity of the separate computer system relative to at least one computer system implementing the at least one service portion of the service.

12. A non-transitory computer system-readable storage medium storing program instructions that, when executed by a computer system, cause the computer system to:

identify a particular computer system of a set of data center computer systems that is implementing at least one service portion of a particular service, the at least one service portion comprising one or more instances of state information, as being associated with an occurrence of a data center event, based at least in part upon receipt of an event signal from a data center building management system (BMS) identifying the occurrence of the data center event and identifying the set of computer systems as being associated with the occurrence of the event; and command replication of the one or more instances of state information of the at least one service portion from the particular computer system to a separate computer system, based at least in part upon identifying the particular computer system as being associated with the occurrence of the data center event.

13. The non-transitory computer system-readable storage medium of claim 12, wherein:

the particular service comprises a plurality of portions implemented by at least the particular computer system, wherein each of the plurality of portions is assigned one of a plurality of priority levels;

to identify the particular computer system of a set of data center computer systems that is implementing at least one portion of the particular service as being associated with the occurrence of the data center event, the program instructions, when executed by the computer system, cause the computer system to identify a particular computer system that is implementing the plurality of portions of the particular service; and to command replication of the one or more instances of state information of the at least one portion from the particular computer system to the separate computer system, the program instructions, when executed by the computer system, cause the computer system to command replication of one or more instances of state information of each of the plurality of portions to at least one separate computer system in a particular order of replication based at least in part upon an order of respective priority levels assigned to each of the plurality of portions.

14. The non-transitory computer system-readable storage medium of claim 13, wherein:
each of the plurality of portions is assigned one of a plurality of priority levels based at least in part upon a determination regarding whether the respective portion of the plurality of portions is implemented exclusively by the particular computer system.

15. The non-transitory computer system-readable storage medium of claim 13, wherein:
the particular service comprises a plurality of portions implemented by at least the particular computer system, wherein each of the plurality of priority levels is associated with a particular rate at which a service portion assigned the respective priority level of the plurality of priority levels is replicated to a separate computer system; and
to command replication of the one or more instances of state information of the at least one portion of the particular service to the separate computer system, the program instructions, when executed by the computer system, cause the computer system to:
command replication of one or more instances of state information of a particular portion of the plurality of portions to at least one separate computer system, the particular portion is assigned a particular priority level of the plurality of priority levels, at a particular rate associated with the particular priority level; and
command replication of one or more instances of state information of the another portion of the plurality of portions to at least one separate computer system, the other portion is assigned another priority level of the plurality of priority levels, at another rate associated with the other priority level.

16. The non-transitory computer system-readable storage medium of claim 12, wherein the program instructions, when executed by the computer system, cause the computer system to:
determine an event priority level associated with the data center event indicated in the event signal from the data center BMS; and
wherein commanding replication of the one or more instances of state information of the at least one portion of a particular service to a separate computer system is further based at least in part upon the determined event priority level associated with the data center event with which the particular computer system is associated.

17. The non-transitory computer system-readable storage medium of claim 12, wherein:
to command replication of the one or more sets of instances of state information of the at least one portion of a particular service to a separate computer system, the program instructions, when executed by the computer system, cause the computer system to:
select the separate computer system from a plurality of computer systems based at least in part upon a physical proximity of the separate computer system relative to the particular computer system of the set of data center computer systems.

18. The non-transitory computer system-readable storage medium of claim 12, wherein:
to identify a particular computer system of a set of data center computer systems that is implementing at least one portion of a particular service as being associated with an occurrence of a data center event, the program instructions, when executed by the computer system, cause the computer system to:
compare the set of computer systems identified in the event signal with a stored set of computer systems implementing portions of the service to identify a match of at least one computer system between the identified set of computer systems and the stored set of computer systems as the particular computer system.

19. The non-transitory computer system-readable storage medium of claim 12, wherein the program instructions, when executed by the computer system, cause the computer system to:
generate a feedback control signal for transmission to the data center BMS, based at least in part upon identifying the particular computer system that is implementing at least one portion of a particular service as being associated with an occurrence of a data center event, to command the BMS to perform at least one environmental control function with regard to the particular zone of the data center.

20. The non-transitory computer system-readable storage medium of claim 12, wherein the program instructions, when executed by the computer system, cause the computer system to:
command a deletion of state information replicated to the separate computer system from the particular computer system, subsequently to commanding the replication and based at least in part upon a subsequent determination that the event signal is a falsely identified occurrence of the data center event.

* * * * *